US012592973B2

(12) United States Patent
Quiros

(10) Patent No.: US 12,592,973 B2
(45) Date of Patent: Mar. 31, 2026

(54) SYSTEM AND METHOD FOR SECURITY CONTROL OVER DATA FLOWS IN DISTRIBUTED COMPUTING SYSTEMS

(71) Applicant: CABER SYSTEMS, INC., Menlo Park, CA (US)

(72) Inventor: Robert Lauro Quiros, Menlo Park, CA (US)

(73) Assignee: Caber Systems, Inc., Menlo Park, CA (US)

( * ) Notice: Subject to any disclaimer, the term of this patent is extended or adjusted under 35 U.S.C. 154(b) by 31 days.

(21) Appl. No.: 18/732,293

(22) Filed: Jun. 3, 2024

(65) Prior Publication Data

US 2024/0406216 A1      Dec. 5, 2024

Related U.S. Application Data

(63) Continuation of application No. 17/669,216, filed on Feb. 10, 2022, now Pat. No. 12,003,546.

(60) Provisional application No. 63/147,889, filed on Feb. 10, 2021.

(51) Int. Cl.
*H04L 9/40*         (2022.01)
*H04L 67/101*       (2022.01)

(52) U.S. Cl.
CPC .......... *H04L 63/20* (2013.01); *H04L 63/1416* (2013.01); *H04L 63/1425* (2013.01); *H04L 67/101* (2013.01)

(58) Field of Classification Search
CPC . H04L 63/20; H04L 63/1416; H04L 63/1425; H04L 67/101
See application file for complete search history.

(56) References Cited

U.S. PATENT DOCUMENTS

| | | | | |
|---|---|---|---|---|
| 2021/0240551 A1* | 8/2021 | Joyce | ...................... | H04L 67/02 |
| 2021/0365357 A1* | 11/2021 | Gamliel | .............. | G06F 11/3692 |
| 2021/0406397 A1* | 12/2021 | Brazeau | .............. | G06F 21/6245 |
| 2022/0067024 A1* | 3/2022 | Pethe | .................. | G06F 16/2452 |

* cited by examiner

*Primary Examiner* — Mohammad W Reza
(74) *Attorney, Agent, or Firm* — Pillsbury Winthrop Shaw Pittman LLP

(57) ABSTRACT

The present application generally relates to methods, systems, and programming for detecting security issues within a computing environment. In some embodiments, data flows may be analyzed to determine links between data sources and metadata. Using the derived relationships, a determination may be made as to whether the is a security issue, such as a security policy ambiguity, or a potential security issue. If so, one or more actions may be taken to prevent or minimize an impact of the security issue.

1 Claim, 14 Drawing Sheets

100

100

Computing System 102

Policy Analysis Subsystem 112

Side Scanning Subsystem 114

Mapping Subsystem 116

Index 134

150

Sensor 106

Client Device 104a

Client Device 104n

800

1200

1300

SYSTEM AND METHOD FOR SECURITY CONTROL OVER DATA FLOWS IN DISTRIBUTED COMPUTING SYSTEMS

CROSS-REFERENCE TO RELATED APPLICATIONS

This application is a continuation of U.S. patent application Ser. No. 17/669,216, filed Feb. 10, 2022 which claims priority to U.S. Provisional Patent Application No. 63/147,889, filed Feb. 10, 2021. The disclosure of each of the afore-listed patent filings is incorporated herein by reference in their entirety.

BACKGROUND

Deployment of microservices into applications has increased recently, which has led to increased security breaches. Some causes of the increased security breaches include transitions to cloud-based systems, frequent changes to microservice-based applications, and new privacy laws. Some existing systems are capable of detecting security breaches or vulnerabilities, but these systems are limited to addressing a specific problem or subset of problems. Furthermore, while some existing systems can detect some security breaches or vulnerabilities, none can detect, prevent, and address every security concern.

SUMMARY

The following is a non-exhaustive listing of some aspects of the present techniques. These and other aspects are described in the following disclosure.

Some aspects include a process that includes: determining, via a security controller deployed within an environment of a user, relationships between entities associated with data flows within the environment; generating, via the security controller, based on the relationships, a computing environment map, wherein data sources and metadata of the data flows are represented as nodes within the computing environment map; determining, via the security controller, a strength metric of a link between a first data source and a second data source exceeds a strength metric threshold indicating that the first data source and the second data source are part of a first data flow, the data sources comprising the first data source and the second data source; extracting, via the security controller, from the first data source and the second data source, respectively, a first group access key and a second group access key; retrieving, via the security controller, a first value corresponding to the first group access key from the first data source and a second value corresponding to the second group access key from the second data source, wherein the first value and the second value each represent a security policy associated with, respectively, the first data source and the second data source; determining, via the security controller, whether the first value and the second value satisfy a security policy similarity condition, wherein the security policy similarity condition is satisfied response to determining that the first value and the second value represent a same security policy; and responsive to determining that the first value and the second value fail to satisfy the security policy similarity condition, generating, via the security controller, an alert indicating an inconsistent security policy has been detected on the first data flow associated with the first data source and the second data source.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
FIG. 1 illustrates an example system detecting security issues within a microservices environment, in accordance with various embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computing security. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Security breaches are becoming more and more common with each passing day. One prevalent cause of the security breaches has been linked to increased adoption of microservices. A microservice refers to a small, weakly coupled, distributed service. A set of microservices can operate together to perform a common task or tasks. A system of microservices may be referred to as a system. The system of microservices have increased scalability and can provide robust solutions by reducing the tasks to smaller chunks that can be addressed individually. The various microservices of the system can communicate with each via application programming interface (API) calls, and users can interact with the microservices using an API gateway (e.g., which includes a set of externally-facing APIs).

The security issues surrounding the proliferation of microservices have some likely causes. A first cause relates to infrastructure being transitioned to the cloud. This transition to the cloud can result in a number of data sources, workloads, and/or services, which communicate via APIs outside of network boundaries (e.g., firewalls, proxies, and/or gateways), becoming ineffective or difficult to insert into data traffic flows. A second cause relates to the complexity and rapid rate of change in microservice-based applications. This can make it difficult for developers to build least-privilege authorization and enforcement policies into their software. This can be particularly problematic when business priorities are pushed ahead of security. A third cause relates to the increase volume and complexities of privacy laws. New privacy laws often necessitate more stringent control over what workloads can process certain private data, where that data can go, and what new data can and will be derived from the private data.

Existing solutions are only capable of detecting certain classes of problems, and of those, only a few are capable of preventing such problems. There is, therefore, a need to detect and prevent problems these solutions are not effective at identifying/preventing.

FIG. 1 illustrates an example system detecting security issues within a microservices environment, in accordance with various embodiments. In some embodiments, system 100 may include computing system 102, client devices 104a-104n, a sensor 106, or other components. Computing system 102, client devices 104a-104n, and sensor 106 may communicate with one another via network 150. Although a single instance of computing system 102 and sensor 106 are represented within system 100, multiple instances of computing system 102 and/or sensor 106 may be included within system 100, and a single instance of each is illustrated to minimize obfuscation within FIG. 1. For example, system 100 may include multiple sensors (e.g., multiple instances of sensor 106), which may be deployed at various locations withing a computing environment.

Network 150 may be a communications network including one or more Internet Service Providers (ISPs). Each ISP may be operable to provide Internet services, telephonic services, or other services, to one or more components of system 100. In some embodiments, network 150 may facilitate communications via one or more communication protocols, such as, TCP/IP, HTTP, WebRTC, SIP, WAP, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, VOIP, or other mechanisms for facilitating communications between components of system 100.

Client devices 104a-104n, which are referred to herein interchangeably as client devices 104, or, for a single client device, is referred to interchangeably as client device 104, may include one or more processors, memory, communications components, and/or additional components (e.g., display interfaces, input devices, etc.). Client device 104 may include any type of mobile terminal, fixed terminal, or other device. By way of example, client device 104 may include a desktop computer, a notebook computer, a tablet computer, a smartphone, a wearable device, or other client device. Users may, for instance, utilize client device 104 to interact with one another, one or more servers, or other components of system 100.

Computing system 102 may include one or more subsystems, such as policy analysis subsystem 112, side scanning subsystem 114, mapping subsystem 116, or other subsystems. Computing system 102 may include one or more processors, memory, and communications components for interacting with different aspects of system 100. In some embodiments, computer program instructions may be stored within memory, and upon execution of the computer program instructions by the processors, operations related to some or all of subsystems 112-116 may be effectuated.

Figure 2:
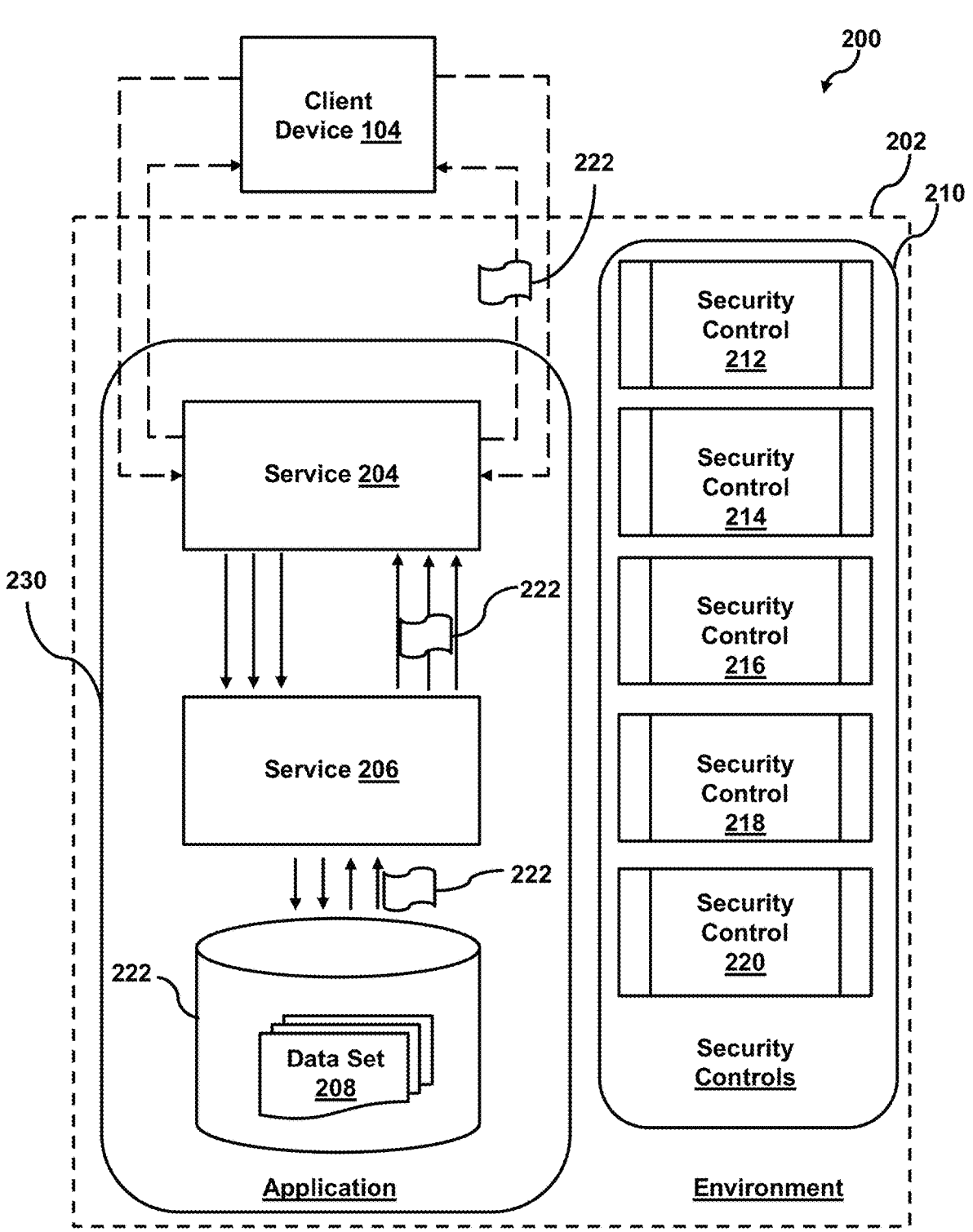
FIG. 2 illustrates a system depicting an example computing environment having broken object level authorization, in accordance with various embodiments.

One of the top security issues relating to microservices is broken Object Level Authorization. As an example, with reference to FIG. 2, system 200 depicts a broken object level authorization scenario. A user or software service of a client device 104 may have general authorization to use an application 230. Application 230 may include a number of services, such as a first service 204 and a second service 206. Furthermore, application 230 may include data sets 208 stored within a storage system 222. Application 230, including services 204, 206 and data sets 208, may form an environment 202, within which application 230 resides.

In an effort to perform a nefarious act, a user or service, via client device 104, may manipulate a request made to application 230. For example, a user may manipulate a request in an attempt to access data (e.g., data sets 208) or identify other vulnerabilities associated with application 230. In some cases, service 204 and/or 206 may have open security gaps not known to one another or an application administrator. For example, service 204 may not check to see if the user of client device 104 (e.g., based on a unique identifier of the user, the client device, an account associated with the client device, and the like) is authorized to make a request to application 230. As service 204 does not perform this check, service 204 determines that the request is valid and requests one or more intermediate services, such as, for example, service 206, handle the request (e.g., the manipulated request from the user). Service 206 determines that a valid request has been made from service 204, where the valid request is to read and return data from data sets 208. Data sets 208 may have a policy allowing service 206 to read data 222 therefrom. Service 206 may read and pass data 222 to service 204, which in turn may pass data 222 to client device 104 (and thus, to the operating user). Therefore, even though the user does not have access to data 222, the user is still able to obtain data 222.

Services 204 and 206 may form a web or mesh of interconnected services between a requestor (e.g., a user operating client device 104) and a data set (e.g., data sets 208). In some cases, services may be shared between multiple applications and/or replicated in different geographic regions where authorization policy requirements can differ. Therefore, it is not practical to build strict policy controls into a service (e.g., service 204, service 206), as no knowledge may be known of where or how the service will be used.

In some embodiments, a set of security controls (e.g., security controls 210) may be used to enforce security policies and/or detect potentiation policy violations. Security controls 210 may be separate from application 230. Security controls 210 may include a plurality of individual security controls 212-220, which may be configured to receive signals from aspects of application 230 (e.g., services 204, 206, data sets 208). Depending on the specific security controls 212-220 and how each was deployed, that security control may also see communications traffic between components, the data stored on disk or in memory of computing systems running services 204, 206, and the data (e.g., data 222) stored in storage systems such as that which holds data sets 208. In some cases, system 200 may also include a plurality of central management components, which hold variables and configuration information that components inside environment 202 can access and use to modify their operation. Many of security controls 210 are capable of accessing the variables and the configuration information inside these central management components and use them as additional signals.

In practice, most of security controls 210 do not receive every signal in the environment. Each of security controls 212-220 has a specific purpose and takes as inputs only signals that are specific to that specific purpose. Each of security controls 212-220 may be limited in what signals it sees based upon where it is deployed within environment 202. While some security controls 212-220 may overlap in which signals multiple security controls 212-220 see, because each of security controls 212-220 is a product from a specific vendor, how each security control process the signals, and what problems the security control can detect from those signals, can differ greatly.

As each of security controls 212-220 has a limited function, situations can occur where each of security controls 212-220 individually do not detect a problem, however a problem does exists that, in the aggregate, is identifiable. In other words, security controls 210 may output a false negative result. Conversely, security controls 210 may detect problems when none is present (e.g., false positive result), which can lead to severe alert overload. In addition to the security control issues discussed above, broken authentication, server-side request forgery, privilege escalation attach, and other vulnerabilities can result in an attacker, malicious code installed in the environment, or normally operating code in the environment moving data through the environment to a location, workload, or storage system where it would not be allowed to be if strict authorization policies were in place and functioning as intended.

Part of the issues with security controls 210 stems from a lack of commonality between security controls 212-220. As each of security controls 212-220 can be developed by a different vendor and function for a different purpose, the signals communicated between security controls 212-220 may not share any commonality, and the overall objective of security controls 210 may not exist. In some cases, a central controller may be implemented to sit on top of the security controls to aggregate the information and determine an aggregate output (e.g., using a voting scheme, unanimity, etc.).

Security control 212 may be configured to validate a user, validate a request, or perform other validation processes for authorizing access. In some cases, security control 212 may be implanted as, or with, an API gateway firewall or a WAF. Security control 214 may be configured to determine whether first service 204 is permitted to communicate with second service 206. Security control 214 may be implemented via a container or workload firewall. Security control 216 may be configured to determine whether the API request and the corresponding API response are valid. In some cases, security control 216 may be implemented using anomaly detection. Security control 218 may be configured to determine second service 206 is authorized to communicate with first service 204. Security control 218 may be implemented via a container or workload firewall. Security control 220 may be configured to determine whether second service 206 is authorized to access data sets 208 stored in storage system 222. In some embodiments, security control 220 may be implemented via data access controls.

Figure 3:
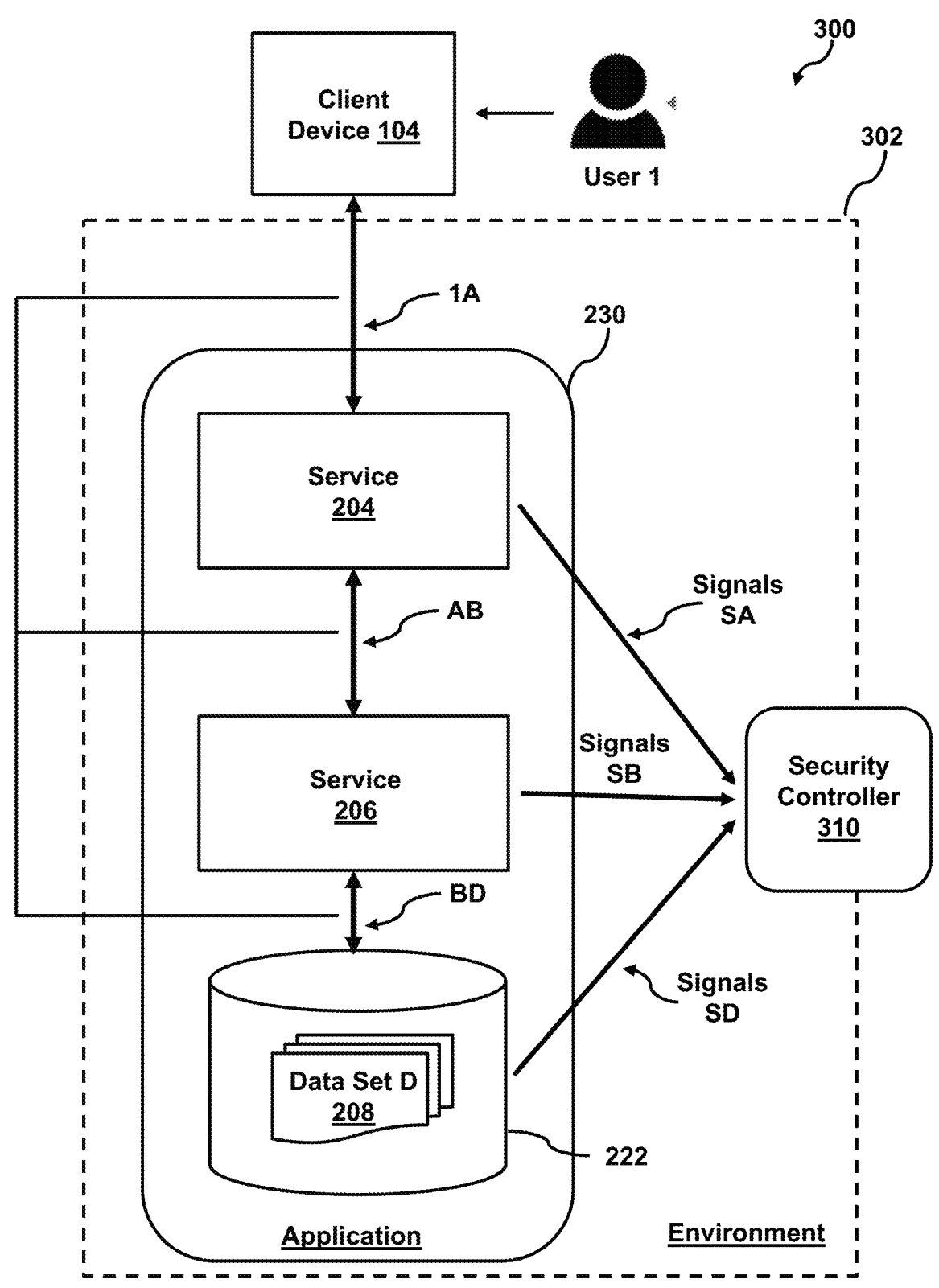
FIG. 3 illustrates a system depicting an example computing environment describing the computational complexity associated with determining relationships between entities, in accordance with various embodiments.

As an example, with reference to FIG. 3, system 300 depicts a scenario where a central security controller, security controller 310, may receive a plurality of signals, signals SA, SB, SD, from software services (e.g., services 204, 206) and data sets 208 of application 230. Security controller 310 may be located within environment 302 or security controller 310 may be located external to environment 302. Therefore, signals SA, SB, SD may be transmitted via a secure communications channel (e.g., TLS with mutual authentication) or not.

Signals SA may include a signal or signals relating to the communications connections between client devices 104 (e.g., a user 1) and service 204 (1A) and plurality of communications connections between service A and service B (AB), and similarly SB contains signals relating to AB and BD, and SD contains signals relating to BD.

Security controller 310, now in receipt of signals SA, SB, and SD, needs to identify relationships between these signals to determine how to analyze the various security controls (e.g., security controls 212-220). However, detecting correlations between multiple signals is complex and computationally expensive.

Figures 4A, 4B, 4C:
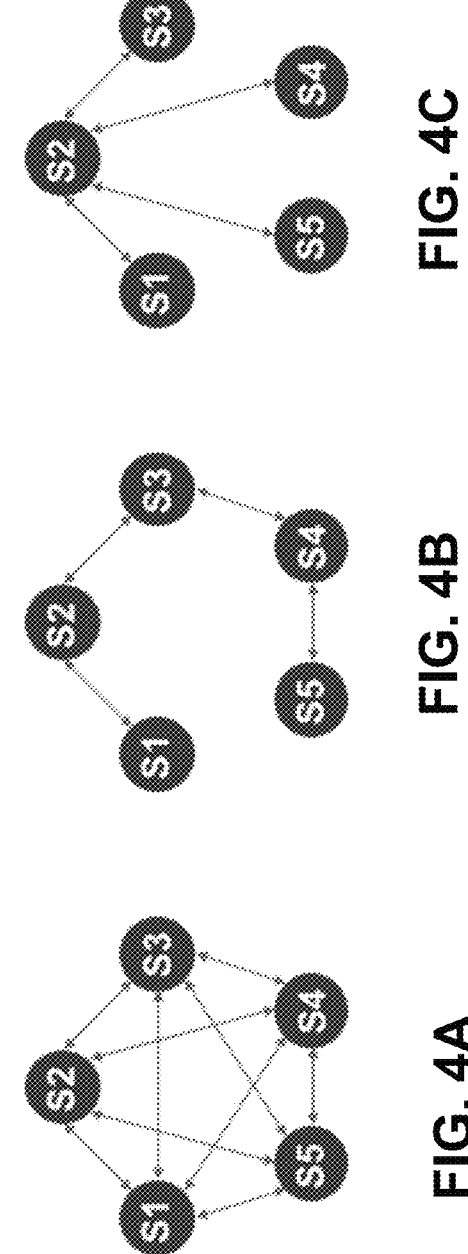
FIGS. 4A-4C illustrates example graphs of related signals within an application composed of one or more services, in accordance with various embodiments.

As an example, with reference to FIGS. 4A-4C, five signals, S1-S5, are depicted. Relationships between the signals can be detected via a brute force correlation of every signal with every other signal. For instance, FIG. 4A depicts each of signals S1-S5 as a node in a graph, where edges of the nodes indicate the connections/correlations between a given first signal and a given second signal. However, this brute force approach is computationally expensive, increasing by the square of the number of signals. Leveraging transitive correlation, a chain of correlations can be built, as depicted in FIG. 4B. This chain can be used to infer a correlation between signals S1 and S5. While this is less computationally complex than the brute force approach of FIG. 4A, the correlation degrades are the longer the chains. If a common factor is identified between signals (e.g., signal S2 is a common factor of signals S1, S3-S5), a higher degree of confidence can be attributed to the correlation between any given pair of signals, while keeping the computational complexity approximately equal to the leveraging approach depicted by FIG. 4B.

The common factor across all portions of the environment (e.g., environments 202, 302) is the data. Data, however, does not have an "identity," per se, as opposed to servers, data sources, and/or users, which have an identity. On the other hand, analyzing the data for particular attributes can make these attributes useable as the common factor, which is a derivative of the data. There are two approaches to building a common factor from the data: (1) API tracing to identify data pathways and (2) data classification to identify data class flows.

Figure 5:
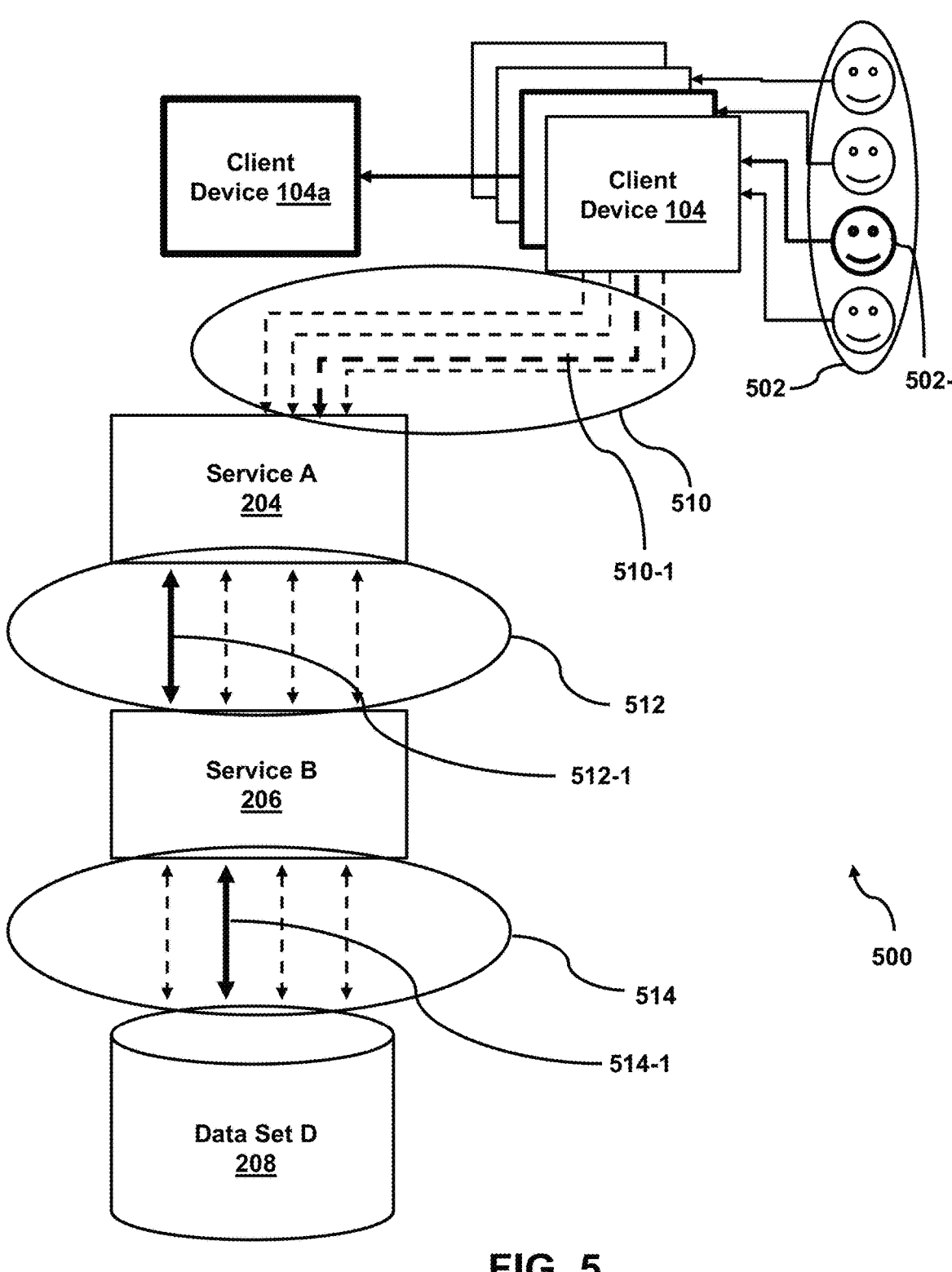
FIG. 5 illustrates a system describing using API tracing to identify data pathways, in accordance with various embodiments.

API Tracing: Microservices are based on individual services that receive a request, process the request, and provide a response to the originator of the request. As an example, with reference to FIG. 5, system 500 includes a specific user 502-1 of users 502, operating client device 104a, may submit a request to service 204. In some cases, service 204 may submit one or more requests to another service, such as service 206, which can make other requests to other services, and so on. Services 204 and 206 may therefore, at any instance, be receiving, submitting, and processing a plurality of requests associated with a plurality of users. For instance, service 204 may be handling connections 510 between respective users 502 operating respective client devices 104. Service 204 may further be configured to set up connections 512 between service 204 and service 206, where each of connections 512 corresponds to a respective one of connections 510. Similarly, service 206 may handle connections 512, as well as set up connections 514 between service 206 and data sets 208, where each of connections 514 corresponds to a respective one of connections 512 (which corresponds to a respective one of connections 510). As an example, user 502-1 may have a connection 510-1 established between client device 104a, operated by user 502-1, and service 204. Service 204 may be configured to set up connection 512-1 with service 206, which corresponds to connection 510-1, and service 206 may be configured to set up connection 514-1 with data sets 208 in storage system 222, which corresponds to connection 514-1. Thus, a path (illustrated as the bolded lines) may be established from connections 510-1, 512-1, 514-1. Furthermore, as connections 510-1, 512-1, 514-1 were set up to handle a request of user 502-1, connections 510-1, 512-1, 514-1 are inherently related.

In some embodiments, the path can be used as a common factor by a security controller, such as security controller 310 of FIG. 3, to correlate signals inside of signals SA, SB, and SC to detect potential problems (e.g., broken object level authorization inside environment 302). For example, service 204 may be capable of determining an identity of user 502-1 from the setup of connection 510-1 by service 204. Therefore, a security controller, such as security controller 310 of FIG. 3, can extract the identity of user 502-1 from signals SA. Similarly, data sets 208 may hold metadata describing the data it contains including policies on access authorization related to the data accessed via connection 514-1, which it can pass to the security controller. Therefore, the security controller can see the identity of user 502-1 as well as the access policy (authorization policy) attached to the data passed to user 502-1 over the path established by connections 510-1, 512-1, 514-1. If the identity of user 502-1 is not allowed to access the data, the security controller can detect a policy violation and send an alert, or other signal, to an administrator or another entity.

The aforementioned process, however, relies on a determination of which connection from connections 512 was set up by service 204 in response to connection 510-1. Therefore, it is difficult to find or trace the link to connection 512-1 given connection 510-1. The nature of microservices has made connection tracing based upon analysis of easily accessible signals to infer the relationship between connections unreliable and impractical. For example, assuming the time between the setup of connection 510-1 and the setup of connection 512-1 are tightly related has proven false. Variability in service load, business logic of the service itself (what the service does), and dependencies on other services to respond before connection 512-1 can be set up, all introduce random factors that affect timing. One solution to this problem can be inserting and propagating connection identifiers in a chain of API calls such that each of connections 510-1, 512-1, and 514-1 have a same connection identifier since they are part of the same path.

Data Classification: In some embodiments, data sets 208 may be used to train a machine learning model to identify different classes of data, and data belonging to a same class may be subject to the same access/propagation policies. Agents can be installed in each service, such as services 204, 206, which gain access to the data flowing in communications connections (e.g., connections 510-1, 512-1, 514-1), and the machine learning model can be used to classify the data in flight. This process does not allow for an exact determination of the specification connections within the path, it can show how each class of data typically flows through the microservices environment. Furthermore, the data classification process requires the agents to be installed everywhere in the environment, which is not a trivial task. Still further, training the machine learning model may be time consuming, and the model may be data set specific and error prone if not supervised correctly.

In some cases, differentially encrypted data may be employed which encrypt data based on an authorization policy. Keys may be distributed to authorized entities for decrypting the data. Unfortunately, this technique also proves to be unmanageable as ensuring that the correct entities receive the keys is difficult, particularly while dealing with the complexity and rapid change in microservices environments. Therefore, this technique is limited in practicality.

Described herein are technical solutions to the aforementioned technical problems related to preventing security issues associated with microservices (e.g., data breaches, data spills, compliance violations, and the like), however the techniques may also be applicable to other layers of the computing hierarchy. In some embodiments, the technical solutions described herein have a technical effect of detecting as well as enforcing policies to prevent security issues. The technical solutions further overcome technical problems related to existing solutions, such as (i) difficulty in integrating into existing software, (ii) limited scope/lack of ability to analyze enough signals to detect issues, (iii) lack of a common denominator to analyze connected/correlated signals, (iv) difficulties in engineering a common denominator, and (v) building such technical solutions that are user-accessible and simple to use.

Figure 6:
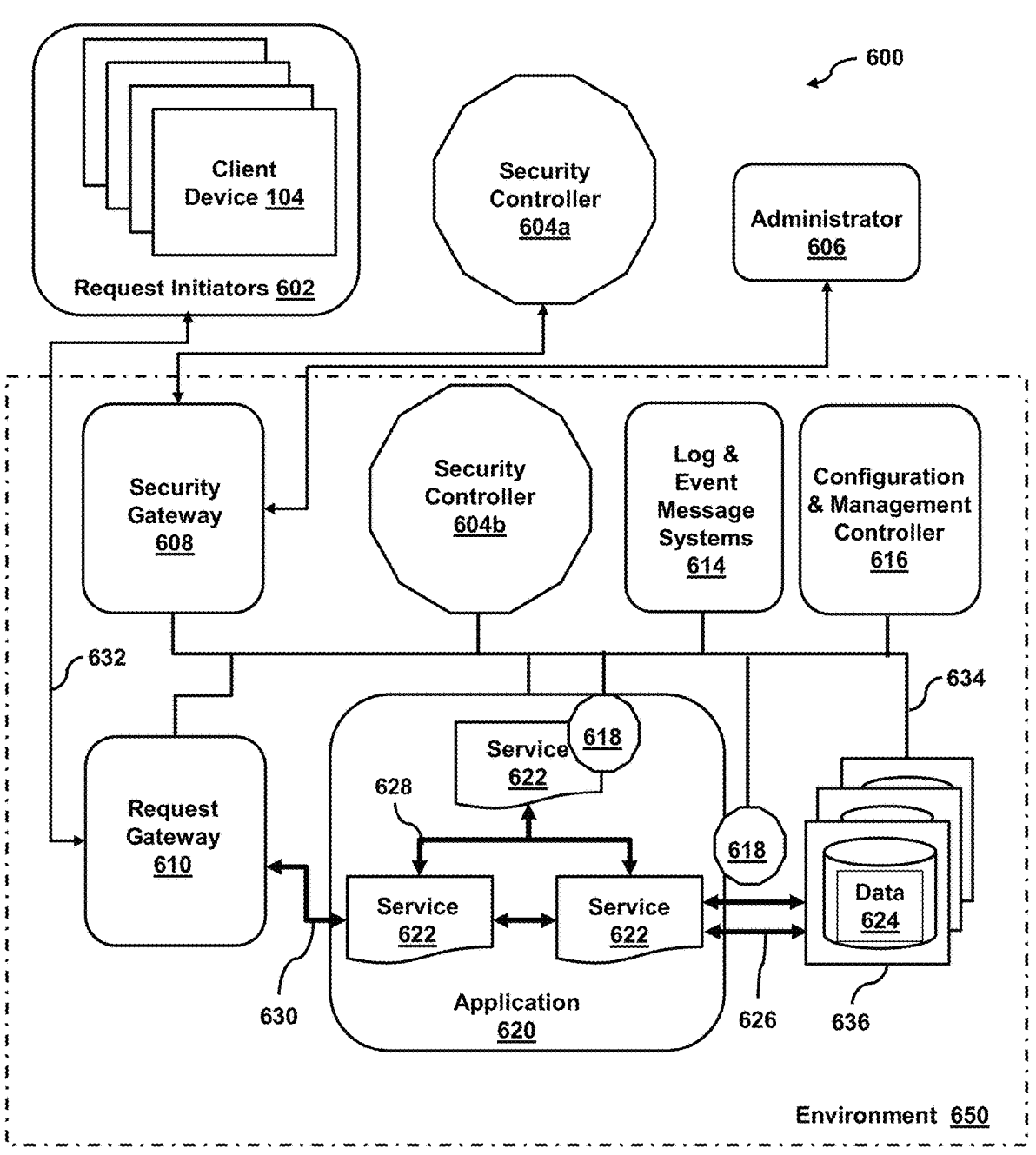
FIG. 6 illustrates a system depicting an example computing environment including a security controller configured to detect, resolve, and prevent security issues within the computing environment, in accordance with various embodiments.

FIG. 6 is a diagram of a system architecture for detecting and prevent security issues, in accordance with various embodiments. System 600 may include a customer environment 650, which can include a security controller 604*b*, a security gateway 606, a request gateway, nodes 618, log and event message systems 614, configuration and management controller 616, application 620 having one or more services 622, and one or more storage systems 636 storing data 624, which are referred to herein interchangeably as data sets 624. System 600 may be a computing system, such as computing system 102 of FIG. 1, or may be a subset of a computing system capable of providing access to data stored therein (e.g., storage systems 636) via one or more connections, and may access the data on other systems via the same or different connections. For example, subsets of computing systems include virtual machines and/or containers. In some embodiments, some of the functionality of security controller 604 may be performed by computing system 102. For example, policy analysis subsystem 112 may be configured, or may configure security controller 604, to perform some or all of the functionality relating to detecting security policy issues and/or resolving such security policy issues.

Data may be exchanged between systems using connections 632, 630, 628, and 626. (e.g., computing components used to execute computer program instructions to perform the functionalities of security gateway 608, request gateway 610, microservices 622, application 620, or other components of environment 650, or combinations thereof). The data being transferred (e.g., data 624) may be read via a communications connection from a system in the computing network (e.g., a router, firewall, proxy, etc.), and non-network communications (e.g., a user downloading a file to client device 104 via a USB drive and then uploading the file to another system). Connections 626-632 may use standard TC/IP, HTTP, or any other communication protocol, or a combinations thereof.

Figure 7:
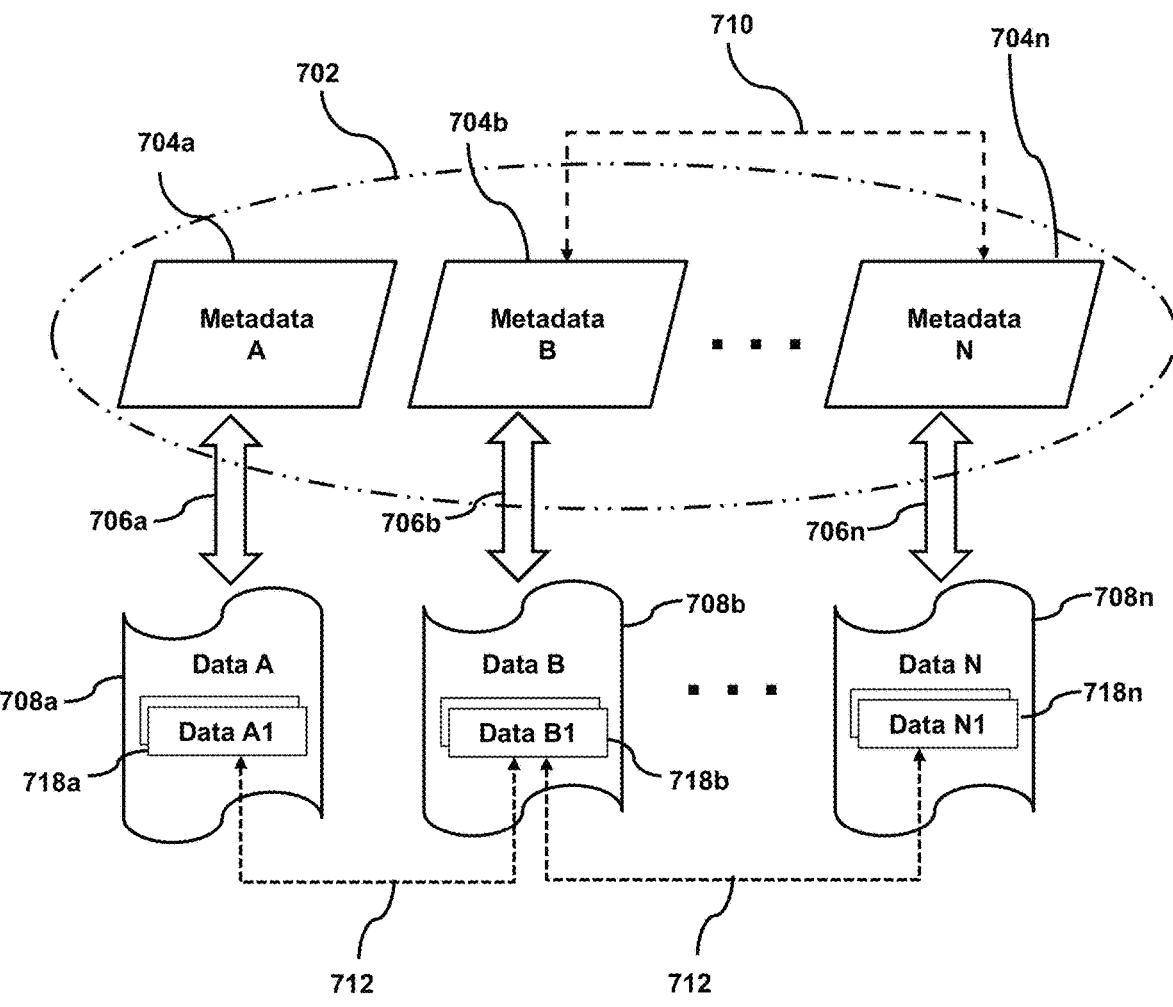
FIG. 7 illustrates an example data flow within a computing environment, such as a microservices computing environment, in accordance with various embodiments.

Within a given connection, there may be a plurality of individual, transient, sessions. For example, a connection between two services (e.g., services 622) may contain many simultaneous API requests and corresponding responses between individual processes that make up each service. A connection between a service that publishes an API to the Internet and an API Gateway may contain thousands of API requests from individual users on the Internet. Each service 622 may be a component of application 620, and may have a defined functionality, program, processes, and/or code, and may also be capable of running on one or more systems. A service can be run on multiple systems that are arranged together as a cluster managed by an auto-scale controller, which itself is a service, that can dynamically add or remove nodes depending on the load the service needs handled. As described herein, a service includes a microservice. For example, application 620, which may be a cloud-based application, may perform certain functions using microservices 622, FIG. 7 is an illustrative diagram of a data flow within the system of FIG. 6, in accordance with various embodiments. Data flow 712 refers to the set of data sources, such as data sources 708*a*-708*n*, which exist in one or more systems, services, or communication channels of environment 650. Each of data sources 708*a*-708*n* include one or more related chunks of data 718*a*, 718*b*, . . . , 718*n*, which may also be referred to herein interchangeably as data chunks (e.g., data chunks 718*a*-718*n*). Additional details regarding determining relationships between data chunks is described below with reference to FIG. 11. For example, a first file may be a data source in a first system, and a second file may be a data source in a second system. If the first file and the second file are text files including one or more common features (e.g., common sentences, common images, common charts, and the like), it can be concluded that the first file and the second file are related. The reasoning for this conclusion is that because the related files exist in two different systems, there must exist, or there must have previously been existed, a data flow between the files and the systems. Otherwise, this would mean that two completely separate systems each generated the same data chunk independently. Through selection of chunk length, and sequencing of the chunks, the likelihood of the separate systems independently generating the same data chunk can be made insignificant (e.g., minimized). A data identity of a data flow may include a set of metadata 702, including component metadata 704*a*, 704*b*, . . . , 704*n*, may have a defined or explicit link 706*a*, 706*b*, . . . , 706*n*, respectively, to data sources 708*a*-708*n* including data flow 712.

Returning to FIG. 6, security controller 604*a* and/or security controller 604*b* may be advantageously deployed with ease as to not compromise performance and operations of the other aspects of environment 650. Nodes 618 refer to sensor/enforcer nodes that, differing from security controllers 604, may modify operation and performance of the other aspects of environment 650. Security controller 604*a*, which refers to a security controller external to environment 650, and security controller 604*b*, which refers to a security controller internal to environment 650, may be configured to detect potential problems (e.g., security breaches, data spills, etc.) within environment 650. For simplicity, security controllers 604 are referred to herein interchangeably as security controller 604, unless specific reference to security controller 604*a* or 604*b* is made, or unless specific reference is made to the security controller being located internal to or external to the computing environment. Security controllers 604 may further be configured to analyze and prioritize areas of risk, which can be conveyed to an end user/administrator. In some embodiments, security controllers 604 may receive signals sent from systems and services within environment 650, and access data, running state, metadata, management information, or other information in the systems and services within environment 650. For example, security controllers 604 may obtain security credentials and may be configured to access the aforementioned aspects of environment 650 during initialization.

In some embodiments, security controllers 604 may be implemented with nodes 618. Nodes 618 may be configured to provide deeper visibility and policy enforcement within environment 650. Security controllers 604 may, via their analysis and prioritization techniques, indicate where to deploy nodes 618, as well as a quantity of nodes 618 to be deployed (which may be an escalating rate (e.g., an initial node at location deemed to be mitigate risk)). However, in some cases, security controllers 604 may be implemented without nodes 618.

Nodes 618 may be software components, such as agents and/or communications proxies. An agent installed inside of service 622 may be configured to view and modify an internal state of service 622. A communication proxy may be connected to the communications network between elements of environment 650. Communication proxies may receive network packets, decode the network packets, inspect headers and data included by the network packet, initiate new connections to other services in environment 650, or perform other functions, or a combination thereof. In some cases, nodes 618 may be plug-ins to existing proxies and/or gateways. Additionally, nodes 618 may be stand-alone software services that intercept, inspect, and proxy communications between elements of environment 650.

In some embodiments, system 600 may include security controller 604*b*, located within environment 650, and having a direct connection to a communications network 634. Alternatively, or additionally, system 600 may include security controller 604*a*, located external to environment 650. In some embodiments, security controller 604*a* may be supplied with security credentials to enable security controller 604*a* to connect to communications network 634 via a security gateway 608. Security gateway 608 may be a firewall, a VPN termination point, or another network device, or a combination thereof. Security gateway 608 may be configured to allow a subset of communications originating from outside environment 650 to elements within environment 650. The subset of communications that are allowed may be selected based on policy rules and/or validation of cryptographic keys. The other communications may be blocked from permeating environment 650. In some embodiments, the security controller may function such that certain functionalities of the security controller execute internal to environment 650 (e.g., security controller 604*b*), while other functions of the security controller execute external to environment 650 (e.g., security controller 604*a*). As an example, the functions of security controller 604*a*, which executes external to environment 650, may be implemented as a multi-tenant Software-as-a-Service (SaaS) service.

Security credentials may be provided to security controllers 604 and nodes 618. The security credentials may be used for configuring security controllers 604 and nodes 618 for access to some or all parts of environment 650. The security credentials may allow security controllers 604 and nodes 618 to access metadata and data stored within the various systems of environment 650, change system configurations, change operating parameters of environment 650, or perform other operations, or a combination thereof. As an example, metadata and/or data may be accessed via a pull mechanism, which may include security controllers 604 and/or nodes 618 opening a connection to a system of environment 650 and requesting to read and/or write data and/or metadata. As another example, metadata and/or data may be accessed via a push mechanism, which may include security controllers 604 and/or nodes 618 configuring a system of environment 650 to open a connection to security controllers 604 and/or nodes 618 for the purpose of sending the data/parameters.

Side-Scanning

Side-scanning refers to a process where data and/or metadata is read or viewed in a system, service, and/or connection without impacting performance or stability, while also not requiring changes to software stored inside the system or service. In some embodiments, security controller 604 may be configured to perform side-scans of storage systems, such as storage systems 636 configured to store data 624, services (e.g., services 622), and/or APIs (e.g., gateways 608, 610) that go through a proxy. For example, security controller 604 may be implemented via computing system 102, and side scanning subsystem 114 may be configured to perform the side-scanning processes described herein.

Storage systems may allow external systems and services to access data and metadata contained therein via well-defined interfaces. Thus, security controllers 604 can perform side-scanning of a storage system, a database, or an NFS filer, by gaining the proper credentials and reading the objects, tables, or files it contains over its well-defined interface.

For systems inside environment 650 (e.g., log and event message systems 614, configuration and management controller 616, systems with which a service includes/employs, etc.) that are interconnected by communications network of communication connections 634, a proxy or tap can provide a copy of the traffic flowing inside the connections between the various systems within environment 650. Side-scanning can be implemented at the locations of such proxies or taps that are already installed in environment 650. In these cases, side-scanning may be implemented manually or using security controller 604*b* to automatically modify the configuration of the proxy or tap to send a copy of the traffic in the connection to security controller 604*b*. In some embodiments, the connections between the systems (e.g., communications connection 634) may be a TCP connection is between systems. Using a network level tap or proxy, access to packets comprising the TCP connection may be obtained. The TLS session may then be decrypted and the packets may be reassembled to obtain an application-level representation of connections 634 for accessing a particular connection's data and/or metadata.

An API is one type of connection (e.g., for connections 634). As an example, an API request may be sent from a first service (e.g., such as service 204) to a second service (e.g., such as service 206), and an API response may be sent back to the first service from the second service. APIs may be internal to environment 650. For instance, the APIs may function between services 622 or between services 622 and other systems in environment 650. APIs may also be public between services 622 inside environment 650 and users (e.g., users operating client devices 104) or services outside environment 650.

Public APIs can go through an API gateway, such as request gateway 610, which may be a type of proxy. Side-scanning may be performed via any API going through an API gateway using shadowing or mirroring functionality built into the API gateway to send a copy of the API requests and responses to security controller 604. In this scenario, security controllers 604 can avoid having to decrypt TLS sessions as the API gateway sends it a decrypted and decoded representation of the API request and response.

In some embodiments, services may also be side-scanned (e.g., via side scanning subsystem 114). Side-scanning a service may include scanning the memory of systems comprising the service to associate those systems, and their component compute processes, to one or more data flows. Such scanning requires installation and running of an agent that would normally have a significant impact to the operation of systems comprising the corresponding service. Services 622 are the individual software microservices that make up an application 620. Services, such as services 622, are typically deployed in containers or virtual machines that run on computing systems that provide CPU, memory, storage, interfaces, or other components needed by the container to run. Multiple containers can be run on one or more systems, with each container instance providing incremental capacity or performance to service 622 as a whole. To overcome this technical problem, the technical solutions described herein include a process for side-scanning a service.

Figure 8:
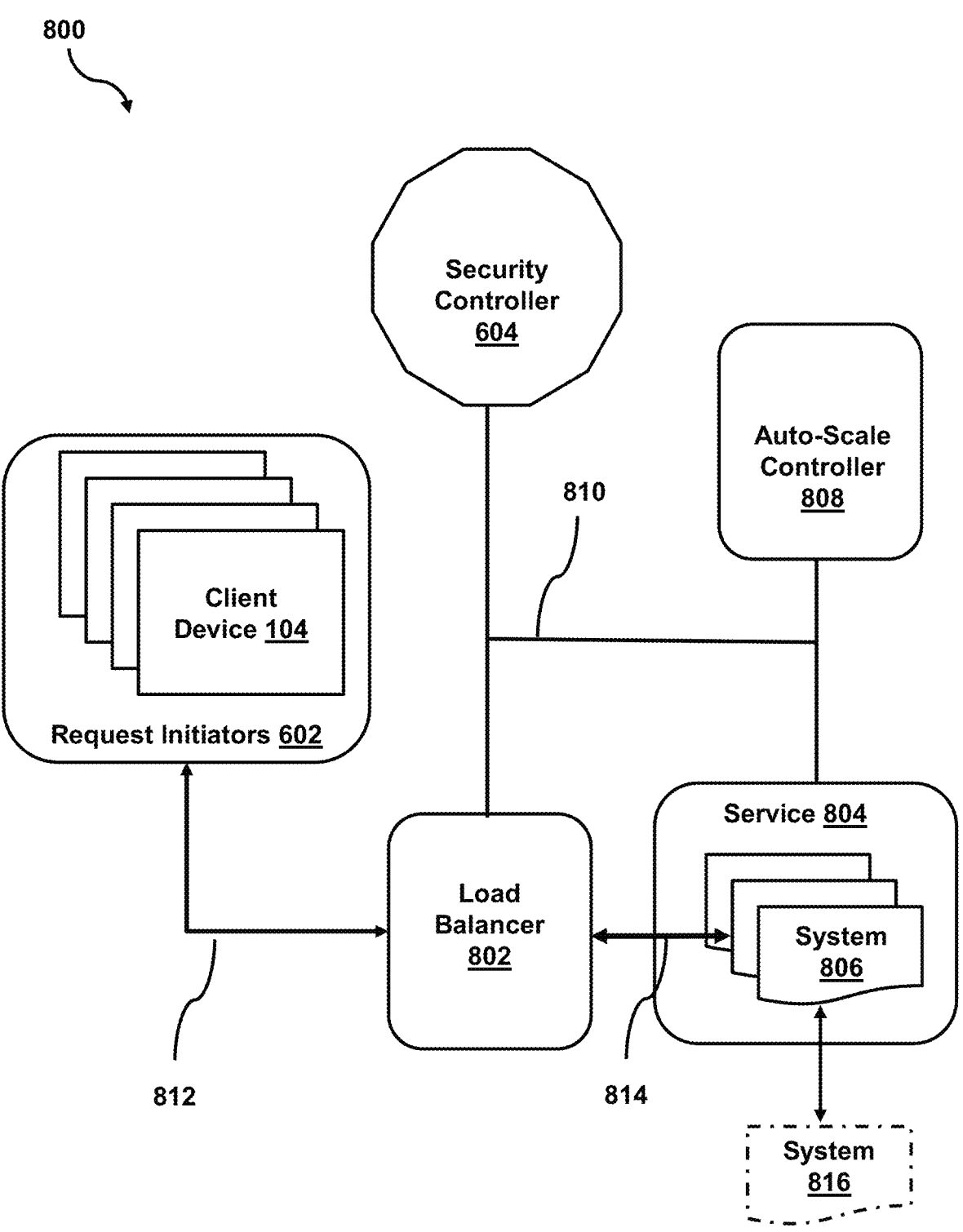
FIG. 8 illustrates an example system whereby a microservices environment's architecture is used to perform a side-scanning of data flows within the microservices environment, in accordance with various embodiments.

A main reason for switching to a microservices architecture is to enable each service to scale independently of other services. Microservices environments, such as in cloud infrastructure services, often can include built-in capabilities to automatically detect a load to a service and scale the number of systems comprising that service to match the load. As an example, with reference to FIG. 8, such a microservices environment 800 may include request initiators 602, security controllers 604, a load balancer 802, a service 804 including one or more systems forming auto-scale group 806, an auto-scale controller 808, or other components. For a given service 622, the number of containers running at a point in time may be determined by an auto-scaling controller that monitors the load on the service (e.g., a load per system of the systems comprising the service) and adds or subtracts containers from the service to modify (e.g., match the load. As described herein, a service is comprised of multiple containers collectively forming an auto-scale group, and a system may run one or more containers. Therefore, there may be one or more systems that the containers for a service run on, and those systems can simultaneously run containers belonging to other services.

In some embodiments, requests 812 submitted by request initiators 602 (e.g., via client devices 104), may pass through a load balancer 802. Load balancer 802 may be configured to send a portion 814 of the requests to each of the containers in auto-scale group 806 system. An auto-scale controller 808, associated with the containers of auto-scale group 806, may monitor a number of requests 812 or a service load and a number of requests 814 going to each system of auto-scale group 806. In some embodiments, when the load per system or container exceeds a first preset threshold (e.g., 75% or more of the corresponding system's processing capacity, 90% or more of the corresponding system's processing capacity, etc.), auto-scale controller 808 may be configured to increase the number of systems included within auto-scale group 806. Auto-scale controller 806 may be configured to signal load-balancer 802 to send a portion of new requests to the newly added systems. In some embodiments, when the load per system or container (e.g., including the newly added systems) falls below a second preset threshold (e.g., 75% or less of the corresponding system's processing capacity, 90% or less of the corresponding system's processing capacity, etc.), auto-scale controller 808 may be configured to initiate a "scale-in" process. The first preset threshold and the second preset threshold may be equal in some cases. Furthermore, instead of preset thresholds, one or more of the first and second preset thresholds may be switched with a configurable threshold. Auto-scale controller 808 may further be configured to monitor the load on the systems the containers are running on so that one or more containers are added to a lightly loaded system and/or one or more containers are removed from a heavily loaded system. Auto-scale controller 808 may ensure that there are the right number of containers to meet the load, and that the systems the containers run on have sufficient capacity to run those containers.

The scale-in process may include auto-scale controller 808 signaling load balancer 802 to stop sending new connections (corresponding to the portion of new requests or another portion of the requests sent to the systems of auto-scale group 806) to one or more systems of auto-scale group 806. After the existing requests being handled by the systems of auto-scale group 806 are all complete, auto-scale controller 808 may be configured to wait for those systems to complete any remaining processes and, subsequently, may remove and terminate the (new) systems from auto-scale group 806. The systems included within auto-scale group 806 may be referred to as "instances" of a system, such as a virtual machine. For instance, for a cloud system architecture, systems of auto-scale group 806 may comprise a microservice (e.g., service 804) operating in a cloud-based microservices environment. Auto-scale group 806 may include a plurality of containers that are actively servicing portion 814 of the requests. Removing a container from auto-scale group 806 may begin with auto-scale controller 808 signaling load balancer 802 to stop sending new connections to that container. For example, the signaling may occur via communications connections 810 connecting the various components within environment 800. Generation of new container instances starts with auto-scale controller 808 signaling a suitable system (e.g., one with a hypervisor or container installed) to retrieve the container's image from a repository, load that image and run it (e.g., using a command 'docker run https://repository/image'). When the container starts up it will get an IP address, which may typically be via DHCP. Security controller 604 may obtain the IP address of the container from environment 800, then add that IP address to the list of IP addresses load balancer 802 will send requests to.

The technical solutions described herein include a process for using of a feature in controllers, such as auto-scale controller 808, to signal other controllers (e.g., security controller 604) that a scale-in of systems has been initiated. When security controller 604 (e.g., side scanning subsystem 114) receives this signal, security controller 604 may be configured to issue commands to preempt the termination of the systems about to be scaled-in by detaching (or removing) these systems from auto-scale group 806. In some embodiments, detaching these systems in common microservices environments (e.g., such as microservices environment 800) can stop these systems from being terminated, leaving the systems in a running state with the contents of their memory intact. The memory of the detached systems can, therefore, be read using one or more memory forensics tools. In some cases, various forensic analysis tools may analyze a computer's memory dump to determine whether malware is present.

Every computer operating system contains state information in well-defined locations, including tables that specify which sections of memory are being used and for what purpose. From that state information, some memory forensics tools can identify the memory areas used for particular tasks such as, for example, to buffer network communications. Some memory forensic tools may also be configured to match memory sections to running and previously running processes. In some cases, a memory forensic tool may be configured to identify container and hypervisor installations in an operating system, and parse the state information there to identify what sections of memory correspond to what virtual machines or containers. The memory forensic tool may further be configured to look into the memory associated with a virtual machine the same way it would look at the host operating system. In some cases, computing system 102, and, in particular, one or more of subsystems 112-116, may view well-known processes that handle API communications, find what memory areas those API communications use, and inspect that memory.

With this process, the memory of systems not actively part of service 804 is read, not any active portion of memory of service 804. For example, if system 816 is an additional instance of the systems of auto-scale group 806, then subsequent to the aforementioned process, the memory of system 816 may be analyzed as opposed to the memory of the systems forming auto-scale group 806. Therefore, the performance, stability, or other aspects of service 804, can remain unaffected. Moreover, as part of gaining access to the management of a given system (e.g., a system that is not actively part of service 804), a software agent may be installed on the given (detached) system to facilitate the scanning process. As an example, having SSH credentials may provide security controllers 604 with root-level access to a detached system, thereby facilitating a mechanism for performing the scanning process.

In some cases, systems of auto-scale group 806 of service 804 may run identical software and receive similar requests. Therefore, each system of auto-scale group 806 may represents a sample or subset of the activity of service 804. Similarly, additional instances of the systems of auto-scale group 806, including those additional instances that reside, after being scaled-in, outside of the computing environment. In some embodiments, the samples may be aggregated to obtain an accurate view of the overall activity of service 804. Furthermore, the scanning of the systems in auto-scale group 806 may be repeated for every scale-in event. This may provide a view of how the activity of service 804 changes over time.

In some embodiments, auto-scale controller 808 may be configured to signal a scale-in process to be initiated by pushing a message to a message-queue. The message queue may indicate which tasks are to be completed by load balancer 802. For example, the message queue may provide load balancer 802 with an indication that a scale-in process is to be started and that the data traffic can be redistributed (evenly) to the existing and the new systems of auto-scale group 806. In some embodiments, side scanning subsystem 114 may be configured to store and/or manage the messaging queue to determine which tasks are to be processed by security controller 604.

Returning to FIG. 6, some embodiments include side-scanning not being able to be performed for certain systems and/or APIs. However, real-time visibility of data flows may still be needed for policy enforcement. For situations as that mentioned above, nodes 618, which may also be referred to herein interchangeably as "S/E nodes 618" or "sensors 618," may be deployed in one or more configurations to environment 650. For example, the configurations may include in-line API scanning via an API gateway/service mesh and/or general in-line connection scanning.

In-line API Scanning via an API Gateway or service mesh: In some embodiments, an API gateway or proxy may be used to deploy an S/E node 618 in-line with a connection between services 622. Some embodiments include API gateways and proxies deployed in service meshes be used to support new code/feature testing. An API gateway may send a configurable portion (e.g., 1% or more, 5% or more, 10% or more, etc.) of data traffic to a new version or versions of service 622 (e.g., one or more new instance of service 622). The portion of the data traffic sent to the new versions of service 622 may be used to test the data traffic while the remaining data traffic may be sent to the existing versions of service 622.

In some embodiments, a cluster of S/E nodes 618 may be deployed within environment 650. In some embodiments, the cluster of nodes 618 may be configured, automatically and/or manually, to behave like a software code release. As an example, a load balancer, such as load balancer 802, may be configured to send requests to a set of containers A, B, C, . . . , O, P that comprise a first version of a service. When a second version of the service is to be tested, some of the containers, such as containers O and P, can be upgraded to the second version of the service and may tell the load balancer to send a portion (e.g., 2%, 5%, 10%, 50%, etc.) of the requests to containers O and P. If the software in containers O or P crashes, only a small portion of traffic is affected and the load balancer may send new requests to the other nodes. If, for example, an S/E node is a container, such as S/E node 618 being a container O*, and is configured to send any request it receives to container O (container O will respond back to container O*), then load balancer 802 may be instructed to send the portion of the requests to container O*, and may test how the S/E node performs with the service while limiting risk.

Thus, because S/E nodes 618 of the cluster receive a configurable portion of data traffic (e.g., the API requests) going to the existing instances of service 622, there is no risk having all of the data traffic going to the new instances of service 622 as there only needs to be a visibility of the data flow. For example, environment 650 may be configured such that all of the data traffic to go to S/E nodes 618 when policy enforcement is needed. In some embodiments, the functionality of subsystem 112 may be implemented via sensors 618. Alternatively or additionally, subsystem 112 may be configured to analyze the data traffic received by sensors 618.

S/E nodes 618 can act as API proxies because S/E nodes 618 can receive API requests from an API gateway (e.g., request gateway 610), as well as from a service mesh. S/E nodes 618 may also copy the contents to a new request that a given S/E node 618 makes to an existing instance of service 622. In such cases, S/E node 618 can be referred to as a requestor for the forwarded request, and the response comes back to S/E node 618. S/E node 618 may then copy the response into a response destined for the original requestor. In this way, S/E nodes 618 can see every part of the requests and responses (collectively "sessions"), and can directly modify either before forwarding it on.

In some embodiments, sessions in connections between services 622 that do not go through an API gateway (e.g., request gateway 610), and where a service mesh has not yet been deployed, security controller 604 may be configured to function as a service mesh controller to manage proxy agents installed into each system comprising services 622 (e.g., systems of auto-scale group 806 of service 804). The service mesh controller can be an embedded version of a service mesh, and the proxy can be deployed alongside application 620. Security controllers 604 may then configure the proxy to forward a portion of the API traffic to a cluster of S/E nodes 618. Thus, instead of installing a proprietary software agent, a well-known open-source agent may be installed instead while still obtaining the benefits of in-line API scanning.

General In-line Connection Scanning: Where services communicate using techniques other than that of APIs (e.g., FTP, SCP, Telnet, etc.), S/E nodes 618 will need to view and decode network traffic at the TCP level. In some embodiments, S/E nodes 618 may be configured to act as a TCP proxy. Inserting a network device in the path of data traffic can be accomplished by appropriate configuration of standard network routers and switches.

In some embodiments, a DNS resolver inside of environment 650 may be configured to send data traffic destined for specific network hosts to S/E nodes 618 instead. S/E nodes 618 may thus act similarly to a forward proxy. In some embodiments, S/E nodes 618 may be embedded as an agent in each system of a service. Using capabilities of each system's OS, such as IP Tables or eBPF, any TCP traffic to or from the corresponding service can be routed to the S/E node agent (e.g., S/E nodes 618 embedded as agents in the system of the service) for inspection and control.

Initial deployment of security controllers 604 and S/E nodes 618 may include a process of inserting security controllers 604*b*, S/E nodes 618 into environment 650. In some embodiments, security controller 604*b* may be configured to perform side-scans or directly scans via an included S/E node 618, an API or APIs published to external users or systems via an API gateway (e.g., request gateway 610).

Figure 13:
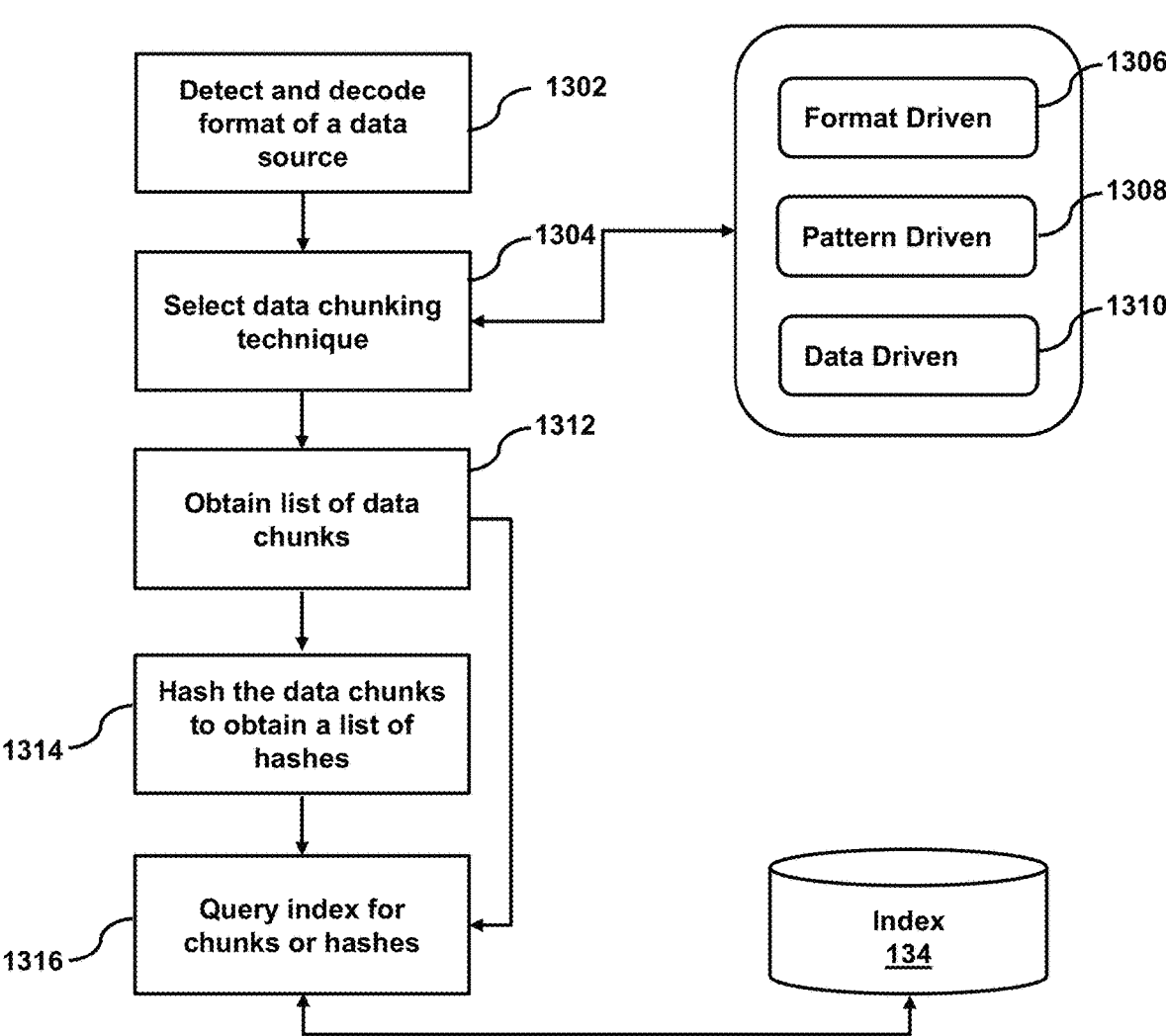
FIG. 13 illustrates an example process for performing data chunking, in accordance with various embodiments.

From data chunks seen on the API(s), an index may be built, as described in greater detail with respect to FIG. 13. The metadata may include at least an API identifier, and may contain headers, request parameters, and/or response parameters. A threshold on an amount of time spent indexing these data chunks and/or a number of entries inserted into the index may be set.

Either in parallel or subsequent to the creation of the index, security controller 604 may be configured to read configuration information from configuration and management controller 616. In some cases, security controllers 604 may also be configured to read configuration information from log and event message systems 614. The read configuration information may be used to create a catalog of all storage systems (e.g., data sets 624) that exist in environment 650.

In response to the threshold being met (e.g., the threshold amount of time spent indexing the data chunks elapsing, the threshold number of entries into the index being exceeded), security controllers 604 may be configured to begin reading data from each of the cataloged storage systems (e.g., data sets 624) that were accessed during the time the index was being built. In some embodiments, security controller 604 may be configured to determine the time of access by either: (a) reading, via an interface of the storage system, a last access time associated with any records, files, or objects in the storage system; or (b) scanning log messages from these storage systems stored in log and event message systems 614 that relate to data access. Reading only data accessed from the storage systems (e.g., data sets 624) during this time reduces an amount of time it takes to read the data and, additionally, reduces compute cost by minimizing reading data that likely did not contribute to the data chunks indexed on the API(s).

In some embodiments, instead of writing data chunks or hashes including the data read from records, files, or objects in the storage systems into the index, the index may be queried to determine if those data chunks or hashes exist in the index. If sufficient matches exist, a data flow that exists between the specific APIs and the specific records, files, or objects that the matching data chunks or hashes came from may be determined.

Figure 9:
FIG. 9 illustrates an example computing environment map depicting a microservices computing environment, in accordance with various embodiments.
Figure 9:
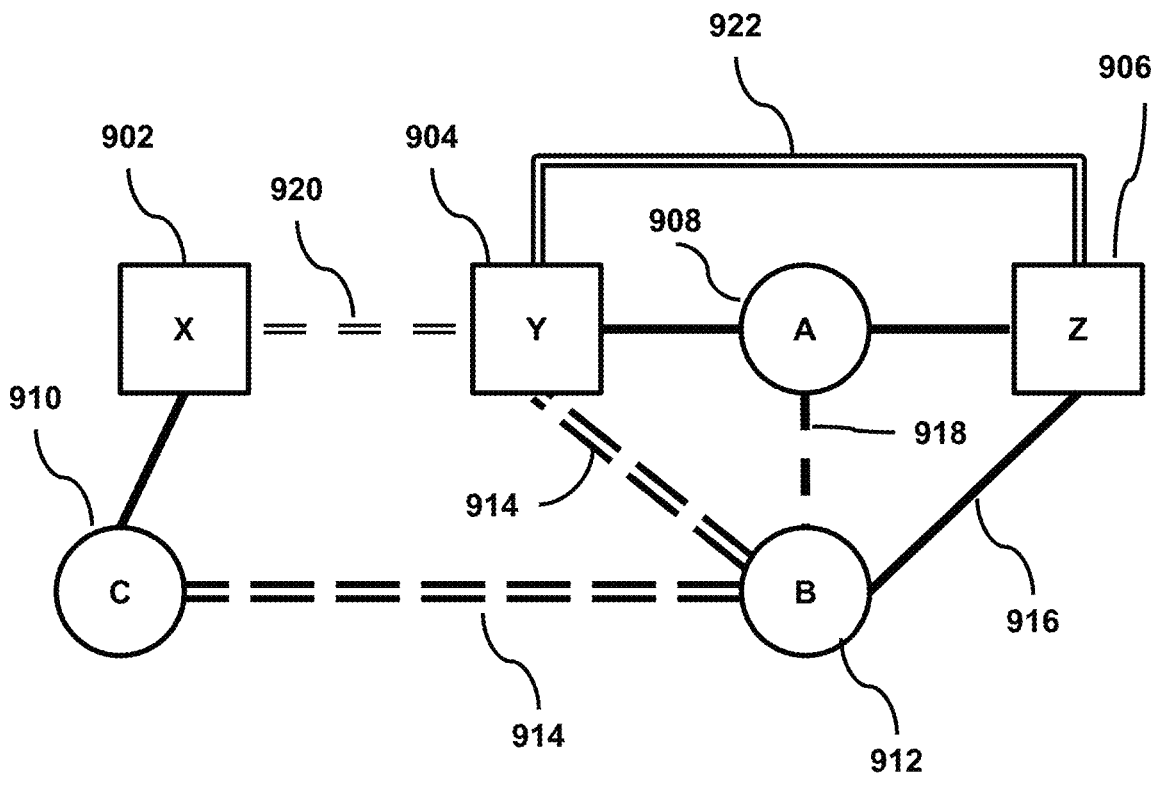

The data flows may be entered into configuration and management controller 616 to obtain a computing environment, such as, for example, computing environment 900 of FIG. 9. Computing environment 900 may provide the user with information (e.g., a graphic, GUI, or other representation) regarding: which storage systems (e.g., data sets 624) the data showing up in the APIs come from; which specific records, files, or objects the data came from; and an amount of data from each storage system, and the relative amounts from each system, the data flow includes. In some embodiments, computing environment 900 may also include information relating to which, if any, API parameters correlate to or cause particular portions of the data flows.

In some embodiments, relationships between different entities associated with the data flows and the data identities may be determined. For instance, the relationships between different data sources (e.g., a link 918 between data source 908 and data source 912), a link between data sources and their explicitly linked metadata (e.g., a link 916 between data source 912 and metadata 906), a link between explicitly linked metadata (e.g., a link 920 between metadata 902 and metadata 904), and metadata linked by relationship to a data flow (e.g., a link 922 between metadata 904 and metadata 906). These relationships may be used to construct a map of a metadata-data computing environment map, such as computing environment 900. In some embodiments, the map of metadata-data computing environment 900 may be built by tabulating pathways/links using a graph database. A graph database refers to a database that uses graph structures (e.g., nodes, edges) to represent and store data. In some embodiments, the map of computing environment 900 may be generated using mapping subsystem 116 of computing system 102, which may be used to implement security controller 604.

Each of links 916, 918, 920, 922 in computing environment 900 may have an associated strength metric that assists in assigning a priority or uncertainty value to inferences made therefrom. Higher-valued strength metrics may indicate that two nodes of the graph are more strongly associated with one another than nodes having a lower-valued strength metric. In some cases, the strength metric for links 918 between data chunks is based on error rates, as described below. For instance, the strength metric may be inherited (respectively) by links 922 between data chunks. Explicit links, such as links 916 and 920, may have the highest strength metric.

From links 916, 918, 920, 922, secondary links 914 (also referred to herein interchangeably as implicit links) may be calculated between data chunks and/or metadata that may otherwise be unrelated. The strength metric of these secondary links may be computed based on the strengths of the primary links used in calculating them, and by the method of calculation. For example, if transitive correlation is used to describe the strength of secondary links 914, the strength of secondary links 914 will decrease non-linearly as the strength of the primary links decrease, due to increasing statistical error. Additionally, the implicit links may be created to any order. For example, using secondary links 914, one or more tertiary links, or higher order links, may be created. In some embodiments a limit for how deep the connections are to be computed may be configurable. For example, a threshold link depth may be set, and may be configurable, to limit how many orders of implicit links will be computed. The reasoning is that with each iteration, the strength metric for these higher order implicit links will decline.

In some embodiments, statistical analysis, machine learning, or other graphical analysis techniques, or combinations thereof, may be used to analyze computing environment 900 and, in particular, the mapping of the various elements within computing environment 900. For example, the analysis process may include finding secondary, tertiary, or other higher-order, links between nodes on the graph (e.g., computing environment 900), and identifying identify inconsistencies, similarities, or patterns that indicate a security issue or risk.

As an example, with reference to FIG. 6, if there is a strong relationship between two data sources, such as a first data source and a second data source, then those two data sources can be represented as being part of the same data flow. Moreover, metadata for both data sources may include a "group access" attribute or key. For example, the "group access" key for one source (e.g., the first data source) has a first value (e.g., "Alice") while the other has a second value (e.g., "Anyone"). Since the group access key is well defined, the key's value indicates which users are allowed to access that particular data source. Thus, an alert may be generated and output to one or more network administrators, users, systems, or other entities, indicating an inconsistent access policy has been detected for the data flow associated with the data sources.

In some embodiments, if security controller 604 is configured such that it can modify the group access attribute in either system, and there is a policy to enforce least privilege access, security controller 604 may be configured to change the value "Anyone" to the value "Alice". In other words, a data source can have its policy value updated based on an inherited value for the policy associated another data source related to that data source.

In some embodiments, requests may include a user identifier (e.g., User_ID_1), an entity ID (e.g., a MAC address), or a token pointing to an identity stored elsewhere in computing environment 650. For example, the token may point to an identity stored via configuration and management controller 616. Furthermore, systems receiving a corresponding request may not pass that identity along to other systems in environment 650, such as that described above with reference to FIG. 2. With an S/E node (e.g., S/E node 618) installed and configured such that it can modify communications between the systems containing the data sources (e.g., the first data source and the second data source) data may be blocked from going to the system with the inconsistent access policy. For example, an incoming API request is determined to include a user ID that is not the value "Alice," and a response to that API request that contains data chunks from a data flow that allows only keys having the value "Alice" to access it, S/E nodes 618 may block or modify the response to prevent the unauthorized access.

Returning to FIG. 9, data found in data sources 908, 910, 912 may metadata 902, 904, 906 explicitly linked to them via links (e.g., link 916). For systems based on recognizable standards, metadata 902, 904, 906 and links 916 are well defined. As described herein, metadata 902, 904, 906 can include, but is not limited to, which is not to suggest that other lists are limiting:

(i) Network communications Systems: Routing tables, NAT tables, source and destination IP addresses, authentication information, TCP headers, HTTP headers, API Keys, JSON keys, etc.

(ii) Processing Systems: Memory addresses, block IDs, page IDs, Virtual Address Descriptors, Filenames, Process Address Space descriptors, buffer pointers, etc.

(iii) Storage Systems: Database table names, keys from key-value pairs, access control lists, object or filenames, folder names, directory names, user defined tags, file descriptors, file type strings, information inside files describing the files contents, etc.

In some embodiments, explicit links between metadata in different systems may exist (e.g., link 920 between metadata 902 and 904). As an example, a service, such as service 622, may send log messages to log and event message system 614. The log messages may include identifiers or pointers to metadata or data residing on service 622. A network device (e.g., a router, switch) may have a routing table that allows communications between two systems identified by their IP addresses. Security systems can also use these explicit links, such as link 920) to analyze metadata relationships and detect inconsistencies and anomalies. This technique may also be used to relate potentially different data flows. Inconsistencies and anomalies may exist between metadata that is not explicitly linked. Therefore, to compare or correlate metadata that is not explicitly linked, other relationships, or a common denominator, will need to be identified.

Existing solutions, as described earlier, use tracing or data classification techniques to build a path or paths showing how an aspect of the data to be controlled is related to individual communications connections between individual elements in a computing environment. The technical solutions described herein overcome the technical problems associated with existing solutions by using a data source, such as data source 908, to represent a set of data that is both delimited and described by a set of metadata. Common data sources include files, objects, database tables, disk blocks, variable values, memory pages, buffers, API payloads, data in network packets, or other data structures, or combinations thereof. Metadata may include a name of a file, an access control list describing entities allowed to read/write the file, request parameters associated with data returned in an API call, a length or location of a memory buffer or disk block, header information in network packets, and the like.

In some embodiments, a data flow may be associated to an individual session or API request based on communications on a given connection between systems. For example, a shadow or mirror of API requests and responses from an API Gateway that is received may be used to associate the data flow with an API request. Some connections may not be capable of discriminating between individual sessions. For example, this can occur if no S/E node 618 has been deployed or associated with the system having that connection. Detection of well-defined metadata (e.g., a session-ID key-value pair) may be used to identify individual sessions. That metadata may be selected for relating data chunks across data sources to give session-level data flow granularity, or exclude it, to obtain an aggregated view of all sessions in a connection. The same choice may be used for any defined metadata that is connected to a data source.

In other words, any data flow can be a subset or a superset of other data flows based upon whether metadata in a given data identity is included or not included. Returning to FIG. 9, data sources A, B, and C (e.g., data sources 908, 910, 912) may be related based on a determination that these data source have common data chunks. Therefore, these data sources are likely part of the same data flow. In FIG. 9, each of data sources 908, 910, 912 include metadata 902, however data sources 908 and 912 can be subdivided by the value of metadata 904. If, for example, metadata 904 is a session ID then data source 908 is composed of a plurality of individual data sources (e.g., n instances of data source 908, where n is the session ID). Similarly, data source 912 may be composed of a plurality of individual data sources (e.g., n instances of data source 912).

Figure 10:
FIG. 10 illustrates another example computing environment map depicting the microservices computing environment of FIG. 9, in accordance with various embodiments.
Figure 10:
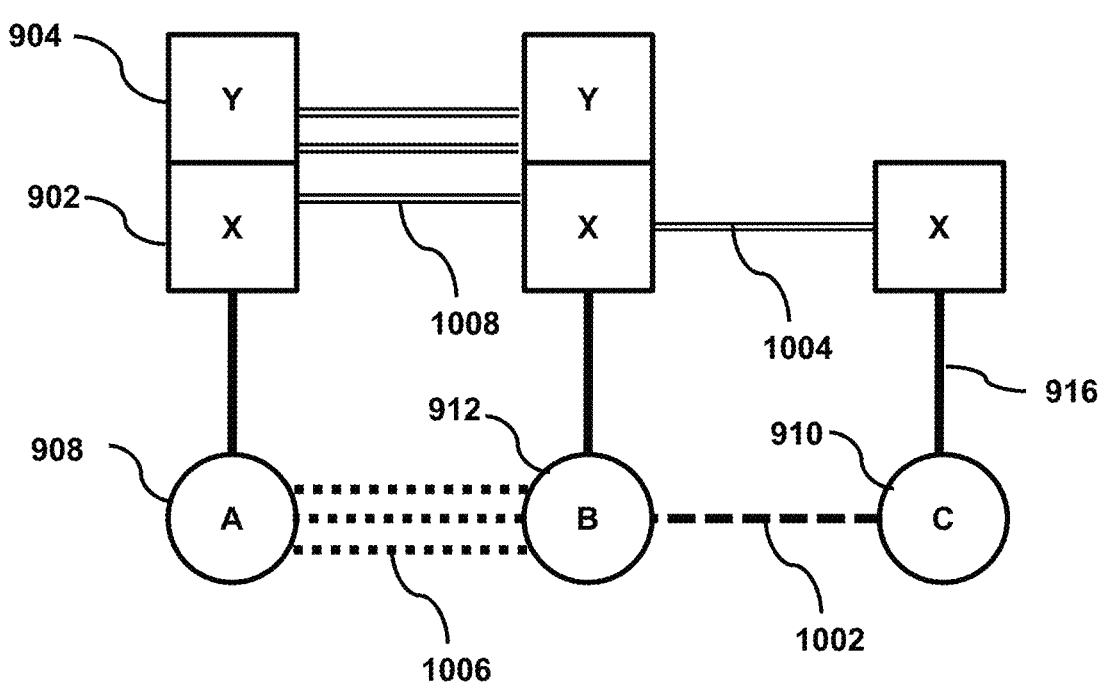

With reference to FIG. 10, for example, map 1000 may depict relationships between individual data source pairs (e.g., the n-th instance of data source 908 and the n-th instance of data source 912). The relationships between data source pairs can be examined to create a multitude of data flows 1006 with associated data identities 1008. For instance, because of metadata 902, all data flows 1006 may be part of data flow 1002. Some embodiments further include extending data flow 1002 between data sources 908 and 912 based on initially ignoring the session ID n, and then later using the session ID n to subdivide data flow 1002 across different session IDs. In some cases, data flow represents the flow of data between instances of data source 902 associated with data sources 910 and 912. The alerting/enforcing may be based upon individual sessions 1006 actually containing data chunks in common with data flow 1002, or based upon the possibility (risk) that individual sessions, formed of data flows 1006, could contain data chunks in common with data flow 1002.

As mentioned previously, the metadata (e.g., metadata 904) can be anything. For example, if instead selecting a session ID as the metadata to be examined, the selected metadata may be a process ID. In this scenario, data flows may be discriminated to determine between processes occurring inside of, or between, systems (e.g., via side-scanning). In some embodiments, analysis of memory from systems (e.g., systems of auto-scale group 806) that are part of a service (e.g., service 804) may indicate data flows between processes that make up a service, as well as data flows between services, by looking at the processes inside of the service that handle network communications.

Figure 11:
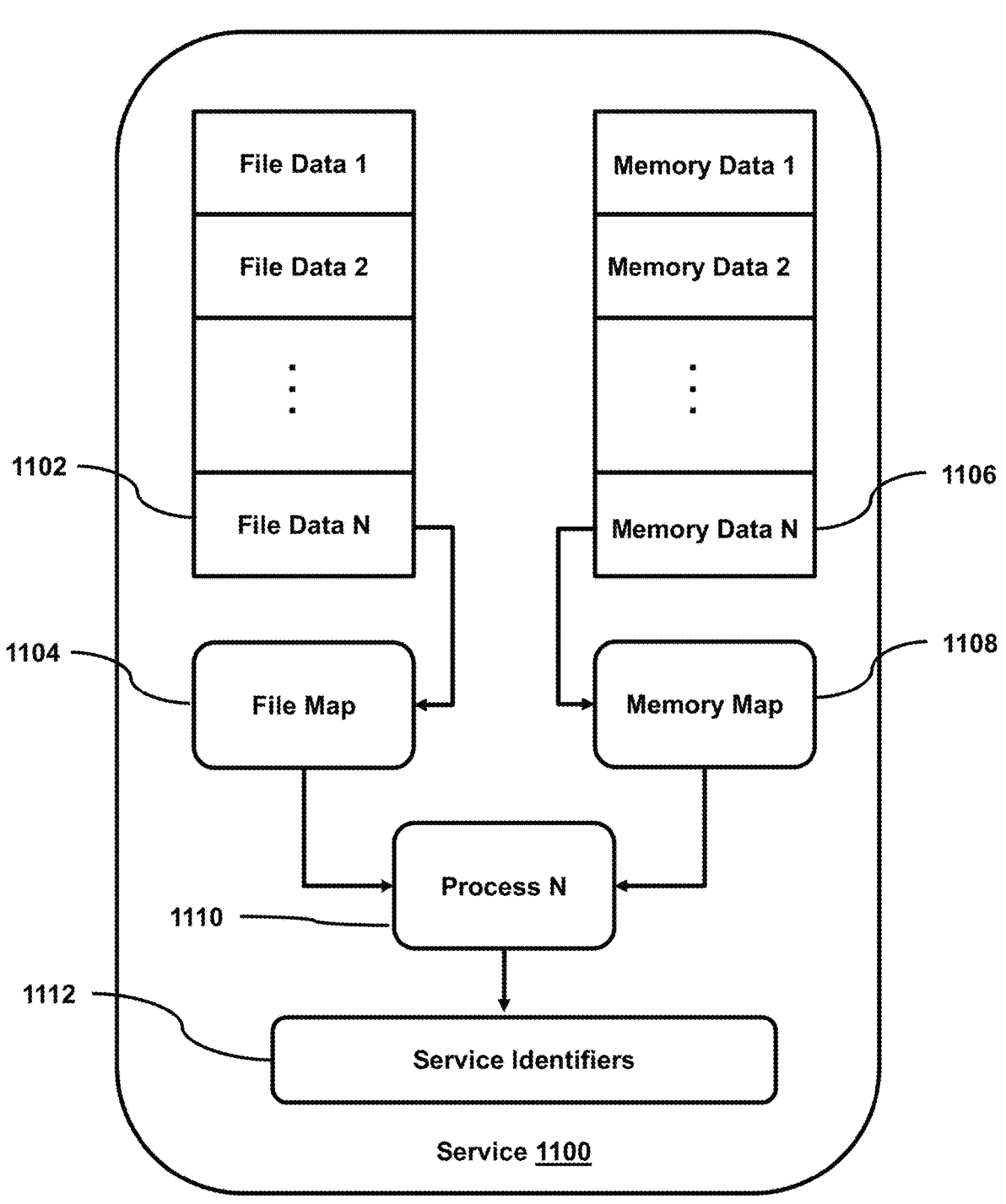
FIG. 11 illustrates an example system configured to analyze memory of a system composing a microservice to allow a security controller to view and analyze data flows associated with the services, in accordance with various embodiments.

As an example, with reference to FIG. 11, a service 1100 (e.g., which may be the same or similar to services 622) may run on processing nodes that run commonly used operating systems (OS) such as Windows or Linux, and may optionally subdivide resources to make those resources available to multiple services. For example, a service can be running in a container, under the management of a container orchestration system for automated software deployment, on a processing node running Linux, and the like. Processing nodes may include a plurality of processors that are configured to transfer data to and from volatile memory, such as memory 1106. Some examples of volatile memory include DRAM, CPU caches, and registers. Processing nodes may also be configured to transfer data to and from non-volatile memory, such as memory 1102. Some examples of non-volatile memory include data written to hard disk drives or solid-state drives. Still further, processing nodes may be configured to transfer data to and from other processing nodes via a communications network.

In some embodiments, an operating system of service 1100 may include data structures 1104 and 1108. Data structure 1104 may refer to a file map, while data structure 1108 may refer to a memory map. Data structures 1104, 1108 may be used to associate data residing in memory 1102, 1106 to a plurality of processes 1110 that together make up the software system of service 1100. Some examples of data structure 1108 (e.g., a memory map) include a virtual address descriptor tree, a process address space descriptor, or other descriptors, or combinations thereof. Data structure 1108 may be configured to provide a direct mapping between memory pages and processes. Some examples of data structure 1104 (e.g., a file map) include FILE_OB-JECTs and OBJECT_HEADERs in Linux that together can be used to map files on memory 1102 to processes 1110. Using data structures 1104, 1108, data stored in volatile memory and non-volatile memory may be connected to processes 1110. Some example techniques that may be used to perform the memory forensic analysis include debugging software, memory analysis software, or other forensic analysis software.

By identifying linkages between processes, the chain of processes 1110 inside service 1100 that touch the same data chunks may be determined. Using the chain of process 1110, data chunks in memory 1102 or 1106 may be connected to a connection 628 with knowledge of well-defined processes in each operating system. Furthermore, a process that reads the data chunks from memory 1102, 1106 may be connected to a process that outputs the data to the network. If the last process in the chain outputs the same data chunks to the network that were received by the first process in the chain, the incoming connection and the outgoing connection may be included together within a common data flow. If a process outputs different data than it receives, a risk that the process transformed the data may be inferred, and the outgoing data chunks may be identified as derivatives of the incoming data. With this inference we can add a link between the two data flows in the environment map (e.g., environment map 900).

Building Data Flows from Relationships Between Data Chunks

Mapping subsystem 116 may be configured to build data flows from relationships between data chunks. In some embodiments, an index may be created from a single data source, which can be used to determine find relationships between that data source and other data sources. Achieving maximum coverage of the computing environment can be accomplished based on the interactions between security controllers 604, nodes 618, and a plurality of different systems and services. This further means that no assumptions can be made about what each service does to data, an underlying format of the data, an amount of data to be looked at to determine relationships, an alignment of data between systems, and the like. Therefore, rather than only looking for similarities between two data sources (e.g., looking for two files or two disk blocks that have identical contents), the data sources may each be separated into subsets or chunks, and these subsets or chunks can be analyzed for relationships between subsets or chunks across systems. If a service reads a file and sends one paragraph of that file to another service, that paragraph should be detected by the file received by the receiving service even though there may be no metadata that relates the two.

In some embodiments, where the size of a data source is large, the underlying data may be sampled before chunking it. Sequence-preserving sampling may be used to implement sequence searches so as to decrease the probability that data is falsely related. One technique for sequence-preserving sampling is described in "Fast Detection of Transformed Data Leaks," Shu et al., IEEE Transactions on Information Forensics and Security, Volume 11, No. 3, March 2016, the contents of which are incorporated herein by reference in their entireties. This technique includes the format of the data source being unknown. However other methods, such as removing all words in a text that are not nouns when the format is known, may also or alternatively be used.

Chunking the data may be performed using a number of different techniques. Each technique may divide a delimited set of data into various chunks in order to determine relationships between the chunks. These techniques may include, but are not limited to (which is not to imply that other lists are limiting): data source delimiters, existing boundaries inside the data source, patterns detected in the data, or data-driven chunking. In some cases, such as when multiple chunking techniques are used, some chunks may overlap or be subsets of other chunks.

Data Source Delimiters: The simplest method of chunking is no chunking at all. If the data source is a file, then the data in the file may be delimited by the start of the file and the end of the file. Because this technique is computationally cheap, hashes may be generated from the data inside two data sources. The hashes may then be compared to determine whether they are equivalent, and the result can be used to determine if more granular chunking is beneficial. If a size or length of data in a data source is small, subdividing it may result in chunks that do not have enough bits to make them sufficiently distinct in the environment. For example, if a chunk is one 8-bit byte, each chunk can be bounded to randomly match one in every 256 bytes in every data source.

Existing Boundaries and Delimiters: If a format of a data source is given or determined based on the use of a pre-processor, and that format provides capabilities to decode and subdivide the data source, those capabilities may be used to chunk the data. For example, a determination may be made as to whether a data source contains only text from its linked metadata (e.g., .txt filename extension), by pre-processing the data in the data source and finding only bytes belonging to the ASCII character set, or by finding a frequency of occurrences of each byte correlates to a written language. In this case, data chunks may be created from each sentence, set of sentences, or paragraph. As another example, a determination may be made as to a type of file stored in a data source (e.g., determining that a data source is a PDF document) by matching a pattern of bytes at a beginning of the file to those commonly used for that type of file (e.g., the pattern of bytes used the beginning of PDF documents). Based on the file type determination, appropriate chunking can be performed. For example, based on the determination that the data source is a PDF, chunks corresponding to each section of text, each image, or other content within the PDF, may be created.

Patterns in the data: In some embodiments, a pattern or patterns of data may be detected, and those patterns may be used as a chunk delimiter. For example, existing pattern matching techniques like regular expression pattern detection may be used to search for the patterns in a data source.

Data-driven chunking: In some cases, patterns or identification of any format of the underlying data in a data source may not be used. Instead, the underlying data may be considered as a stream of bits. The data may then be chunked based on the data itself. For example, the data may be streamed through a rolling hash function to create a chunk boundary whenever a subset of bits output by the rolling hash matches a specified value. For example, Rabin-Karp fingerprinting for data-driven chunking may be used.

In some embodiments, relationships between data chunks may be identified. After a data source is decomposed into a sequence of chunks, a searching index, database, or other data structure may be created. Each data chunk in the index may include: a hash of the data in that chunk, the data in the chunk, a sequence number for the chunk, the metadata, a pointer to the metadata associated with the data source that the chunk came from, or other information, or combinations thereof. If an existing index has been created, chunks from new data sources or changed data sources may be related to chunks already in the index. Relationships between data chunks may be identified using multiple methods individually or in combination based on, for example, a length of data chunks, whether an authoritative source of the data exists, an amount of data in the environment being secured, the magnitude of error acceptable, and other factors. The methods may include: exact match, hash matching, substring searching, machine learning classification techniques, pattern-based classification techniques, syntactic similarity matching, metadata linkages, or other techniques, or combinations thereof. Each of these techniques has specific matching error characteristics. In some embodiments, the error value may be used to provide a measure of how strong the relationship is between two matching chunks. Where the error of the technique is high, the relationship between chunks may be classified as weak. Weak relationships between chunks are useful for detecting potential security issues or risks. Where the error is predictably low, the matching technique may be leveraged for both detection and enforcement.

As mentioned previously, one methodology of the technical solutions described herein is to identify and show security risks to a user in their computing environment with minimum of deployment effort, and then use the identification and prioritization of these security risks as a roadmap for deploying nodes (e.g., S/E nodes 618) to bring the security risks into focus, see if a security risk is being exploited, and/or add policy enforcement to prevent the security risk from being exploited in the future. Combining matching techniques that have low cost to deploy but higher error rates with others that have higher cost to deploy but have lower error rates can provide the user with optimal security risk identification and remediation.

Exact Matching/Hash Matching: In some embodiments, two chunks may be said to be related if their hashes are identical. Similarly, where the data belonging to chunks is stored in the index, a bitwise comparison may be performed to determine if two chunks are the same and thus related. Two chunks being "the same" refers to two chunks having a similarity score, computed based on how similar data chunks are to one another, greater than or equal to a threshold similarity score (e.g., 90% or more similar, 95% or more similar, 99% or more similar, etc.). Both exact matching and hash matching have a comparatively low error rate. In either case, where there is a match, an error is computed, and thus a strength of the relationship between the two chunks. The error may be computed based on a probability that a randomly chosen sequence of data of that same length, out of the entirety of data in the environment, would match.

Substring search: In some embodiments, a suffix-tree based approach, such as the Aho-Corasick algorithm, may be used to match a chunk or chunks from one data source to the underlying data of another data source. This technique of matching chunks from different data sources is favored when: (i) it is computationally less expensive than other search approaches, or (ii) when chunking based on existing known delimiters in the data source, and the lengths of individual chunks, are smaller than a minimum chunk size selected for data driven chunking. The minimum chunk size may be selected based on historical chunk sizes selected by previous users, and may be dynamically configured for different chunking steps. The substring search can be computationally less expensive for data sources of relatively small length where, through automatic format detection or configuration, the sources are known to use a limited character set. For example, English text files are known to use 8-bit ACSII characters, which can be harnessed for the substring search. Substring searching has a comparatively low error rate. The error may be computed for individual chunks, and from the individual chunks' errors, the joint error may be computed.

Machine Learning Classification: In some cases, the data sources in an environment are large. Thus, it can be impractical to store and search trillions of individual chunks in an index to find relationships. For such scenarios, the data chunks may be run through a machine-learning based classifier to associate the data chunk with a particular class (e.g., from a predefined taxonomy of data chunk classes). Data chunks belonging to the same class are referred to as being related. The error machine learning classification of data chunks can be greater than that of substring searching or exact matching/hash matching because the classifier depends on the training process and the training data used to train the classifier. Therefore, training the classifier in some or all computing environments can be expensive in both time and computing resources. In some cases, pre-training the classifier with a range of training data sets prior to deployment in a computing environment can reduce the cost of deployment, however the error rate can be high. Still further, the amount of data an ML classifier must see before being deployed is typically high.

Pattern-based Classification: In some cases, data patterns may be associated with classes. For each class, a set of regular expressions (e.g., REGEX expressions) with patterns typical of that class may be stored, optionally with each pattern having a weight representative of its importance to that particular class. The data chunks may then be passed through a REGEX engine to count a number of matches per pattern multiplied by the pattern's weight, and compare the results across classes to each other, as well as to a threshold value, to determine the resolved class of the data chunk or chunks. Patterns and their parameters may be based on estimates and prior processes. The data passed to the REGEX engine may include sequences that match a pattern but are not related to their determined class (e.g., the classification results in a false positive). This technique has a relatively high error, but relatively low deployment cost so long as a set of default patterns is maintained.

Pattern-based Classification: In some cases, data patterns may be associated with classes. For each class, a set of regular expressions (e.g., REGEX expressions) with patterns typical of that class may be stored, optionally with each pattern having a weight representative of its importance to that particular class. The data chunks may then be passed through a REGEX engine to count a number of matches per pattern multiplied by the pattern's weight, and compare the results across classes to each other, as well as to a threshold value, to determine the resolved class of the data chunk or chunks. Patterns and their parameters may be based on estimates and prior processes. The data passed to the REGEX engine may include sequences that match a pattern but are not related to their determined class (e.g., the classification results in a false positive). This technique has a relatively high error, but relatively low deployment cost so long as a set of default patterns is maintained.

Syntactic Similarity: In some cases, for comparison of text or written works, natural language processing techniques can be used to determine a similarity in meaning or content between two different data chunks of pre-defined length. If the measure of similarity between two chunks is sufficiently strong, it can be concluded that there exists a relationship between those data chunks. This technique, however, has a limited scope and relatively high computational costs, but can produce results with a lower error rate than that of the REGEX classification, with no need to maintain default pattern sets.

Metadata linkages: In some cases, a relationship between data chunks may not be detected by any of the aforementioned techniques, yet the data chunks may be related by explicitly linked metadata (e.g., link 920 between metadata 902 and 904). For example, two otherwise unrelated data chunks may each have a metadata tag with the same value. If the tag values are important to the enforcement of a security policy, then the data chunks may be related to one another based on both data chunks being part of a common class, and thus, should have the same least-access enforcement.

The technical solutions described herein may make use of tracing tags, as discussed above, to connect data flows across services. For example, with respect to FIG. 5, service 206 may be configured to place the same trace ID on both specific connection 512-1 and specific connection 514-1. In some embodiments, the common trace ID may be used to connect the data chunks seen on specific connections 512-1 and 514-1 into a common data flow. In some embodiments, the common trace ID may be used to relate the data flow(s) on connections 514 to the data flow(s) on connections 512 into an origin data flow and derivative data flow, respectively. The error rate for data flows built on metadata relationships between data chunks is highly variable and dependent on the specific metadata used.

In some embodiments, the error associated with two data sources being related may be decreased by matching multiple chunks in each data source that exist in a same sequence in each data source. The probability multiple chunks in any order can be found in common between data sources is much higher than finding those same chunks in exactly the same order in both sources.

In some embodiments, multiple contiguous data chunks may be aggregated to create another data chunk, and the resulting chunk may be inserted into the index. For example, if chunks are sentences in a text file, a chunk may be created that combines all the sentences into a paragraph, then other chunks that are all the paragraphs on a page, and so on. Those data chunks may be inserted into the index as well. This has the technical effect of reducing computation by taking a longest match first approach when matching chunks between data sources.

In some embodiments, hierarchical fingerprinting common in de-duplication systems may be used where the sequence of hashes of data chunks are themselves fingerprinted to create a new sequence of hashes which are entered into the index, and so on. Given a sequence of chunks from a first data source (e.g., data source 204), the hierarchical fingerprinting and search in the index created from chunks in a second data source (e.g., data source 206) may be replicated for matching hashes in higher levels of the hierarchy that indicate the same sequence of hashes.

In some embodiments, a sequence number for each data chunk can be inserted into the index. The sequence numbers may be used to determine if a sequence of data chunks from a new or changed data source are the same as the sequence of the matching chunks in a data source already indexed.

The technical solutions described herein may use the sequence search to reduce the length of the hash of each chunk in the index, and therefore the overall size of the index. For example, if the hash length for a chunk of data is reduced to 16 bits, yet require a sequence of 3 data chunks to match before deciding a relationship exits, the total effective hash length of the sequence is 3×16 bits, or 48 bits. The probability of seeing a collision with a 48-bit hash is substantially smaller than with each 16 bit hash. Furthermore, matching based on sequences can improve detection (e.g., by a factor of 10). Data is typically read and written in a sequence (e.g., from beginning to end).

The aforementioned techniques may be used to identify sequences of data chunks in sequences of communications between two systems. For example, if each copy of a record required one API request and response between a first system and a second system, but the relevant data source in each response was small, the temporal sequence of request/response pairs may be used to increase the certainty that the API requests and responses are indeed moving data from the first system to the second system. This can be the case trying to relate a series of API calls that each move a single important value (e.g., a credit card number) from a database, and those values may exist in other databases but in a different sequence.

In some embodiments, machine learning models described above may be a deep learning model, such as, and without limitation, a convolutional neural network (CNN), a region-based CNN (R-CNN), a Fast R-CNN, a Masked R-CNN, Single Shot Multibox (SSD), and a You-Only-Look-Once (YOLO) model (lists, such as this one, should not be read to require items in the list be non-overlapping, as members may include a genus or species thereof, for instance, a R-CNN is a species of CNN and a list like this one should not be read to suggest otherwise). As an example, an R-CNN may take each input text, extract entities from the text, and compute features for the text using a CNN. The features of the text may then be classified using a class-specific SVM, identifying text tokens included in the text, named entities text tokens are resolved to be, topic/category information for each text token, or other information.

The machine learning techniques that can be used in the systems described herein may include, but are not limited to (which is not to suggest that any other list is limiting), any of the following: a convolutional neural network (CNN), a region-based CNN (R-CNN), a Fast R-CNN, a Masked R-CNN, Single Shot Multibox (SSD), and a You-Only-Look-Once (YOLO) model, Ordinary Least Squares Regression (OLSR), Linear Regression, Logistic Regression, Step-wise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions).

Example Flowcharts

Figure 12:
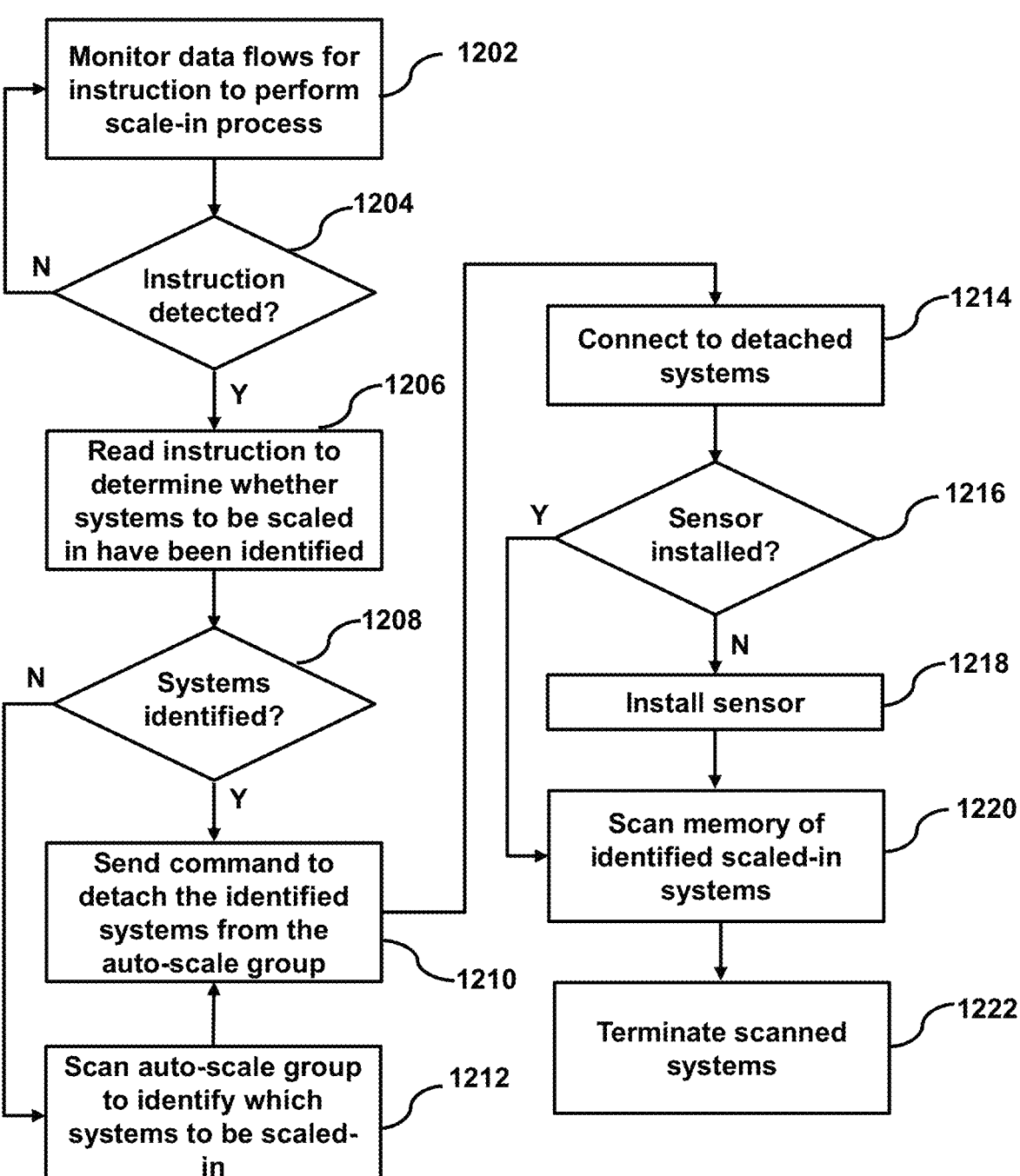
FIG. 12 illustrates an example process for scaling systems of a microservice to perform side-scanning, in accordance with various embodiments.

FIG. 12 illustrates an example process 1200 for scaling systems of a microservice to perform side-scanning, in accordance with various embodiments. FIG. 13 illustrates an example process 1300 for performing data chunking, in accordance with various embodiments. The processing operations of each process presented below is intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In some embodiments, the operations included by process 1200 may be performed by a subsystem that is the same or similar to side scanning subsystem 114. In some embodiments, process 1200 may include a step of a user, corresponding to a computing environment, subscribing to the scale-in process to allow security controller 604 to perform the side scanning process. For example, the user may subscribe to scale-in messages for the systems of auto-scale group 806.

Process 1200 may begin at operation 1202. In operation 1202, data flows may be monitored for an instruction to perform a scale-in process. In some embodiments, when the load per system or container (e.g., including the newly added systems) falls below a preset threshold (e.g., 75% or less of the corresponding system's processing capacity, 90% or less of the corresponding system's processing capacity, etc.), auto-scale controller 808 may be configured to initiate a "scale-in" process. Initiation of the scale-in process may begin based on an instruction. The scale-in process may include auto-scale controller 808 signaling load balancer 802 to stop sending new connections (corresponding to the portion of new requests or another portion of the requests sent to the systems of auto-scale group 806) to one or more systems of auto-scale group 806. The instruction detected may correspond to the detected signal sent to load balancer 802.

Operation 1204 may include determining whether the instruction was detected. If the instruction was not detected, process 1200 may return to operation 1202 to continue waiting and monitoring for the instruction to be detected. If, however, the instruction was detected, process 1200 may proceed to operation 1206. In operation 1206, the instruction may be read to determine whether the systems to be scaled-in have been identified. For example, security controller 604 may be configured to determine which systems included in auto-scale group 806 are to be terminated from receiving API requests.

In operation 1208, a determination may be made as to whether the systems to be scaled-in have been identified. If, in operation 1208, it is determined that the systems have been identified, process 1200 may proceed to operation 1210. In operation 1210, a command may be sent to detach the data flows of the identified systems from the auto-scaled group. For example, security controller 604 may detect the data traffic to and from the systems from the auto-scaled group to be scaled-in. If, however, in operation 1208, it is determined that the systems to be scaled-in have not been identified, process 1200 may proceed to operation 1212. In operation 1212, the auto-scale group may be scanned to identify which systems are to be scaled-in.

In operation 1214, security controller 604 may connect to the detached systems. For example, security controller 604 may connect to detached systems 816. In some cases, security controller 604 may be provided with security credentials for the system to facilitate connection to the detached systems. In operation 1216, a determination may be made as to whether a sensor has been installed in association with the connections to the detached systems. For example, a determination may be made as to whether an instance of sensor 618 has been installed at the location associated with the connection to detached systems 816. If, in operation 1216, it is determined that no sensors have been installed, process 1200 may proceed to operation 1218. In operation 1218, the sensor may be installed within the computing environment. For example, an instance of sensor 618 may be installed at a location determined to be a security risk. In operation 1220, memory of the identified scaled-in systems may be scanned for security policy issues. If, at operation 1216, it is determined that one or more sensors have been installed within the computing environment, process 1200 may proceed to operation 1220. In operation 1222, the scanned systems may be terminated. In some embodiments, after the scanned systems have been terminated, process 1200 may return to operation 1202 to continue monitoring for future occurrences of the instruction being included within data flows.

FIG. 13 illustrates an example process 1300 for performing data chunking, in accordance with various embodiments. In some embodiments, the operations included by process 1300 may be performed by a subsystem that is the same or similar to mapping subsystem 116. Process 1300 may begin at operation 1302. At operation 1302, a data source to be analyzed may be detected, and a format of the data source may be decoded. In some embodiments, sampling may also be performed to the decoded format of the data source. In operation 1304, a data chunking technique may be selected. Some example data chunking techniques include a format driven data chunking technique 1306, a pattern driven data chunking technique 1308, a data driven data chunking technique 1310, or other data chunking techniques, or combinations thereof. In some embodiments, the selection of a data chunking technique may be based on a configuration of the data source, the security controller, or the user's computing environment. In some embodiments, selection of the data chunking technique may include executing that data chunking technique to generate data chunks representing portions of the data source.

In operation 1312, a list of the data chunks generated by the data chunking technique may be obtained. In operation 1314, the data chunks may be hashed to obtain a list of hashes. The hashing process may employ a hash function to perform the hashing. As an example, the SHA hashing algorithm may be used as the hash function. In operation 1316, the list of data chunks and the list of hashes may be used to query index 134 for data chunks and/or hashes that match data chunks and/or hashes from the lists (e.g., the list of data chunks and the list of hashes). In some cases, if index 134 is not yet built, instead of querying the index in operation 1316, operation 1316 alternatively includes building an index entry or entries for the data chunks and hashes, and writing the entry/entries to index 134. In some cases, metadata associated with the data source (e.g., determined by explicit linking), may also be included in the index entry written to index 134. For example, the index entry may include an indication of (e.g., a pointer) the associated metadata.

Figure 14:
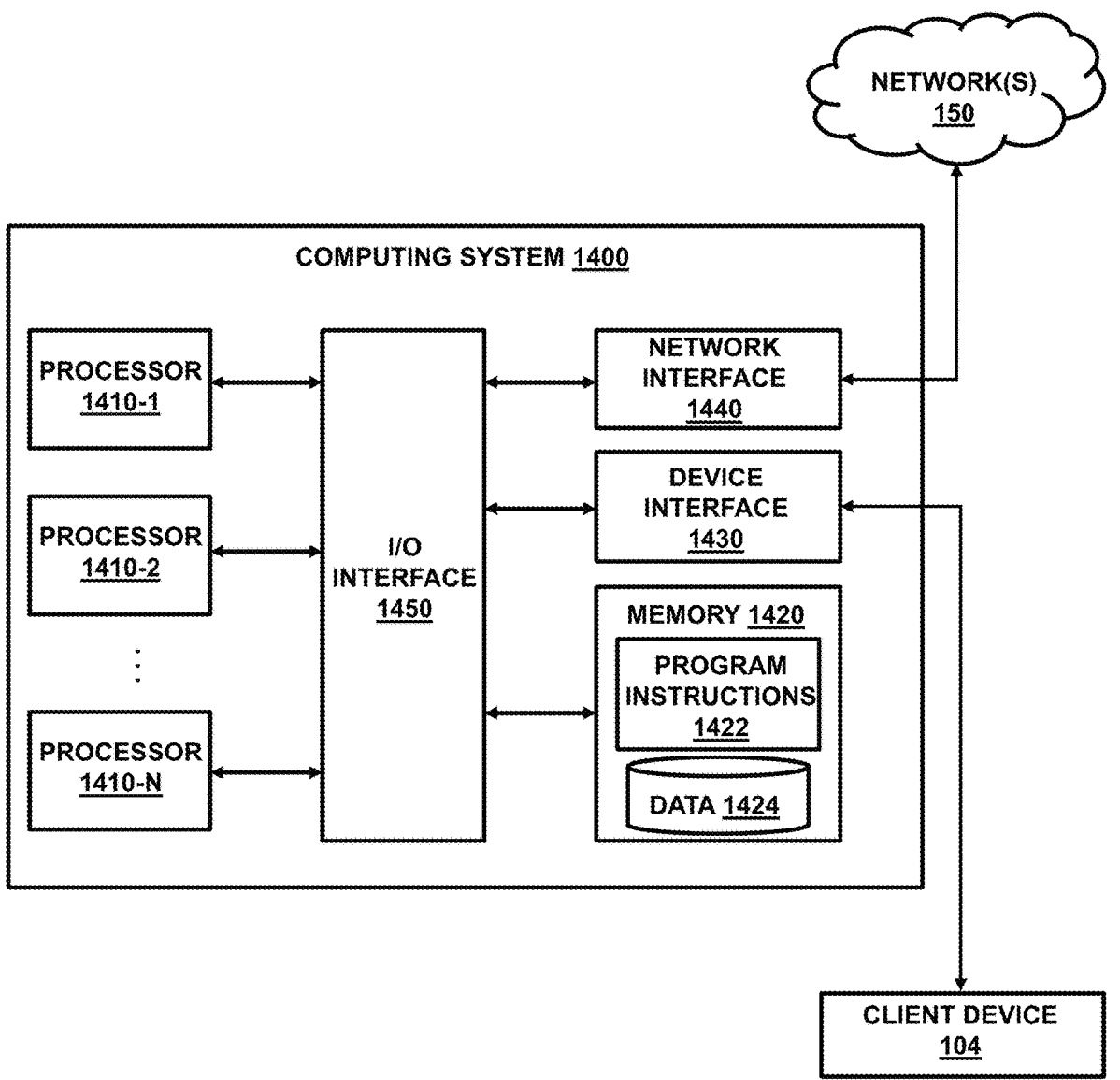
FIG. 14 illustrates an example of a computing system by which one or more of the present techniques may be implemented, in accordance with various embodiments.

FIG. 14 is a diagram that illustrates an exemplary computing system 1400 in accordance with embodiments of the present technique. Various portions of systems and methods described herein, may include or be executed on one or more computer systems similar to computing system 1400. Further, processes and modules described herein may be executed by one or more processing systems similar to that of computing system 1400. In some embodiments, computing system 102, mobile computing device 104, or other components of system 100 may include some or all of the components and features of computing system 1400.

Computing system 1400 may include one or more processors (e.g., processors 1410-1-1410-N) coupled to system memory 1420, an input/output I/O device interface 1430, and a network interface 1440 via an input/output (I/O) interface 1450. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1400. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1420). Computing system 1400 may be a uni-processor system including one processor (e.g., processor 1410-1), or a multi-processor system including any number of suitable processors (e.g., 1410-1 to 1410-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1400 may include a plurality of computing devices (e.g., distributed computer systems) to implement various processing functions.

I/O device interface 1430 may provide an interface for connection of one or more I/O devices to computing system 1400. I/O devices, such as client devices 104, may include devices that receive input (e.g., from a user) or output information (e.g., to a user). I/O devices may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices may be connected to computing system 1400 through a wired or wireless connection. I/O devices may be connected to computing system 1400 from a remote location. I/O devices located on remote computer system, for example, may be connected to computing system 1400 via a network and network interface 1440.

Network interface 1440 may include a network adapter that provides for connection of computing system 1400 to a network. Network interface may 1440 may facilitate data exchange between computing system 1400 and other devices connected to the network. Network interface 1440 may support wired or wireless communication. The network may include an electronic communication network, such as the Internet, a local area network (LAN), a wide area network (WAN), a cellular communications network, or the like.

System memory 1420 may be configured to store program instructions 1422 or data 1424. Program instructions 1422 may be executable by a processor (e.g., one or more of processors 1410-1-1410-N) to implement one or more embodiments of the present techniques. Program instructions 1422 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1420 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1420 may include a non-transitory computer readable storage medium that may have program instructions stored thereon that are executable by a computer processor (e.g., one or more of processors 1410-1-1410-N) to cause the subject matter and the functional operations described herein. A memory (e.g., system memory 1420) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1450 may be configured to coordinate I/O traffic between processors 1410-1-1410-N, system memory 1420, network interface 1440, I/O devices (e.g., client devices 104), and/or other peripheral devices. I/O interface 1450 may perform protocol, timing, or other data transformations to convert data signals from one component (e.g., system memory 1420) into a format suitable for use by another component (e.g., processors 1410-1-1410-N). I/O interface 1450 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1400 or multiple computing system 1400 configured to host different portions or instances of embodiments. Multiple computing system 1400 may provide for parallel or sequential processing/execution of one or more portions of the techniques described herein.

Those skilled in the art will appreciate that computing system 1400 is merely illustrative and is not intended to limit the scope of the techniques described herein. Computing system 1400 may include any combination of devices or software that may perform or otherwise provide for the performance of the techniques described herein. For example, computing system 1400 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1400 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1400 may be transmitted to computing system 1400 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A1. A method, comprising: determining, via a security controller deployed within an environment of a user, relationships between entities associated with data flows within the environment; generating, via the security controller, based on the relationships, a computing environment map, wherein data sources and metadata of the data flows are represented as nodes within the computing environment map; determining, via the security controller, a strength metric of a link between a first data source and a second data source exceeds a strength metric threshold indicating that the first data source and the second data source are part of a first data flow, the data sources comprising the first data source and the second data source; extracting, via the security controller, from the first data source and the second data source, respectively, a first group access key and a second group access key; retrieving, via the security controller, a first value corresponding to the first group access key from the first data source and a second value corresponding to the second group access key from the second data source, wherein the first value and the second value each represent a security policy associated with, respectively, the first data source and the second data source; determining, via the security controller, whether the first value and the second value satisfy a security policy similarity condition, wherein the security policy similarity condition is satisfied response to determining that the first value and the second value represent a same security policy; and responsive to determining that the first value and the second value fail to satisfy the security policy similarity condition, generating, via the security controller, an alert indicating an inconsistent security policy has been detected on the first data flow associated with the first data source and the second data source.

A2. The method of embodiment A1, wherein the environment comprises a microservices environment, the security controller is configured to detect security risks within the microservices environment.

A3. The method of any one of embodiments A1-A2, wherein the security controller is deployed with security credentials enabling the security controller to access microservices and systems comprising the microservices within the environment.

A4. The method of any one of embodiments A1-A3, further comprising: deploying one or more sensors within the environment, wherein the one or more sensors are configured to monitor data flows associated with at least one of microservices or systems comprising the microservices within the environment.

A5. The method of embodiment A4, wherein each of the one or more sensors is deployed to a location within the environment based on a security risk computed as being associated with connections at the location.

A6. The method of any one of embodiments A4-A5, wherein the one or more sensors are configured to view and modify the data flows associated with the at least one of the microservices or the systems comprising the microservices within the environment.

A7. The method of any one of embodiments A1-A6, wherein an external security controller, located external to the environment, is monitor the data flows within the environment, the external security being implemented as a Software-as-a-Service (SaaS) service.

A8. The method of any one of embodiments A1-A7, wherein determining the relationships between the entities associated with the data flows within the environment comprises: accessing, via the security controller, metadata and data associated with the data sources, wherein the relationships between the entities are determined from the metadata and the data.

A9. The method of embodiment A8, wherein accessing the metadata and the data comprises: opening a connection to a system of the microservice; and requesting to read or write data and/or metadata from/to the system.

A10. The method of any one of embodiments A8-A9, wherein accessing the metadata and the data comprises: configuring the system to open a connection to the security controller for sending the metadata and the data.

A11. The method of any one of embodiments A1-A10, wherein the operations further comprise: steps for performing side-scanning to read data and metadata associated with at least some of the data sources for determining the relationships.

A12. The method of any one of embodiments A1-A11, wherein the operations further comprise: modifying a configuration of a tap deployed within the environment such that the tap provides a copy of data traffic flowing through at least a portion of the environment to the security controller, wherein the relationships are determined from the copy of the data traffic.

A13. The method of any one of embodiments A1-A12, wherein the environment comprises at least a microservice comprised of a plurality of systems forming a group of systems.

A14. The method of embodiment A13, further comprising: analyzing a load per system of the plurality of systems; determining whether the load per system exceeds a first threshold load; responsive to determining that the load per system exceeds the first threshold load, causing a number of systems included within the group of systems to increase by adding one or more additional instances of the system to the group of systems; providing a first instruction to a load balancer within the environment to cause a portion of API requests directed to the microservice to be routed to the additional instances; and responsive to determining that the load per system is below a second threshold load, providing a second instruction to cause the load balancer to stop direction the portion of API requests to the additional instances of the system.

A15. The method of any one of embodiments A13-A14, wherein the operations further comprise: detecting, via the security controller, the second instruction being sent to the load balancer; issuing, via the security controller, a command to the load balancer to prevent the additional instances from being terminated and cause the additional instances to be removed from the environment.

A16. The method of any one of embodiments A1-A15, wherein one or more sensors are deployed within the environment such that each sensor is connected between microservices of the environment, wherein each sensor is configured to: receive API requests from an API gateway associated with a given microservice; generate a duplicate of contents included in the API requests; generate new API requests comprising the duplicate of the contents, wherein the new API requests are to be provided to the given microservice; receive responses to the API requests from the given microservice; generate a duplicate of the contents included in the API responses; and provide the duplicate of the contents included in the API responses and the duplicate of the contents included in the API requests to the security controller to determine whether a security risk exists with the connection between the microservices.

A17. The method of any one of embodiments A1-A16, wherein the environment comprises a plurality of storage systems each configured to store data, the operations further comprise: reading the data stored within each storage system, wherein the read data comprises data accessed during a time that an index of data chunks was built; determining a time of that the data was accessed; and providing the data to the security control.

A18. The method of any one of embodiments A1-A17, wherein the reading of the data occurs responsive to a threshold condition being satisfied, wherein the threshold condition being satisfied comprises at least one of: a threshold amount of time elapsing while indexing data chunks into an index, or a number of entries included within the index exceeding a threshold number of entries.

A19. The method of any one of embodiments A1-A19, further comprising: determining at least one of: a subset of storage systems included within the environment from which the data originates, at least one of records, files, or objects from which the data originates, or an amount of data from each of the storage systems included within the data flows of the environment.

A20. The method of embodiment A19, wherein the relationships comprise at least one of: a relationship between the data sources, a link between data sources and metadata explicitly linked to a respective one of the data sources, or metadata linked by a relationship to the data flows.

A21. A non-transitory computer-readable medium storing computer program instructions that, when executed by one or more processors of a computing system, effectuate operations comprising the method of any one of embodiments A1-A20.

A22. A system, comprising: a computing systems configured to execute computer program instructions to effectuate operations comprising the method of any one of embodiments A1-A20.

A23. A system, comprising: memory storing computer program instructions; and one or more processors configured to execute the computer program instructions to effectuate operations comprising the method of any one of embodiments A1-A20.

What is claimed is:

1. A method of tracing application programming interface (API) requests to identify API requests made on behalf of a user in a distributed computing system, the method comprising:

receiving, at a security controller, information regarding a plurality of API requests between multiple entities in a distributed computing system, wherein the entities include multiple microservices executing in the distributed computing system, multiple users associated with multiple client devices, and multiple data sources hosting data to be consumed by any of the entities;

performing data tracing to identify a set of the API requests received on behalf of a first user of the users, wherein performing the data tracing includes:

among a first set of connections between a first microservice and the client devices, identifying a first connection corresponding to a first API request from a first client device associated with the first user, wherein the first connection is identified based on user identification information associated with the first user, among a second set of connections between the first microservice and a second microservice, identifying a second connection corresponding to a second API request made by the first microservice in response to receiving the first API request from the first user, and among a third set of connections between the second microservice and a first data source, identifying a third connection corresponding to a third API request made by the second microservice in response to receiving the second API request from the second microservice, wherein the third API request is for obtaining data from the first data source on behalf of the first user, wherein the first connection, the second connection and the third connection are identified as associated with the first user based on a common connection identifier (ID) associated with the first connection, the second connection and the third connection;

extracting, via the security controller, from the first data source, a first security policy that is indicative of whether the first user is permitted to access the data from the first data source; and responsive to determining that the user identification information associated with the first user fails to satisfy the first security policy, generating, via the security controller, an alert indicating a security policy violation.

* * * * *